US012762284B2

(12) United States Patent
Nnadi, Jr. et al.

(10) Patent No.: US 12,762,284 B2
(45) Date of Patent: Oct. 13, 2026

(54) SYSTEMS AND METHODS FOR AUTHENTICATING QUALIFICATIONS TO PREVENT FRAUD

(71) Applicant: FMR LLC, Boston, MA (US)

(72) Inventors: Macquin Nnadi, Jr., Greenville, NC (US); Kristin Smith, Fayetteville, NC (US); Franklin Mata, Cary, NC (US)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 18/797,769

(22) Filed: Aug. 8, 2024

(65) Prior Publication Data

US 2026/0044632 A1 Feb. 12, 2026

(51) Int. Cl.

| | |
|---|---|
| ***H04L 29/06*** | (2006.01) |
| ***G06F 21/31*** | (2013.01) |
| ***G06F 21/64*** | (2013.01) |
| ***G06Q 10/1053*** | (2023.01) |

(52) U.S. Cl.

CPC .............. *G06F 21/64* (2013.01); *G06F 21/31* (2013.01); *G06Q 10/1053* (2013.01)

(58) Field of Classification Search

CPC .......... G06F 21/64; G06F 21/31; G06F 21/36; G06F 16/50; G06F 2212/455; G06F 2212/464; G06Q 10/1053; G06Q 40/0841; G05B 2219/35428; G05B 2219/35567; G05B 2219/23291; G05B 2219/33111; G05B 2219/36177; G08B 5/226; G01M 11/065; G01N 15/1433; G01N 21/8851; G01N 2203/0647; G01N 2223/401; G01N 2223/421; G01G 23/3721; G06K 11/00; G06V 10/84; G06V 30/1988; G06T 7/00; G03H 2001/0428; G03H 2001/0452; H04L 9/0637; H04L 9/3228; H04L 9/3234; H04L 12/417; H04L 2012/6451; H01J 2237/221; H04N 1/00005; H04N 1/00169; H04N 1/2179; H04N 1/2187; H04N 1/32128; H04N 1/32144; H04N 1/32267

See application file for complete search history.

(56) References Cited

U.S. PATENT DOCUMENTS

2025/0077625 A1* 3/2025 Coleman ............. G06F 21/1014
2025/0272600 A1* 8/2025 Singh ..................... G06N 20/00

OTHER PUBLICATIONS

Open Badges Frequently Asked Questions & Glossary, 1Ed Tech Consortium Inc., 2014, 5 pages, https://openbadges.org/about/faq.

* cited by examiner

*Primary Examiner* — Edward Zee
*Assistant Examiner* — Leynna Truvan
(74) *Attorney, Agent, or Firm* — Cesari and McKenna, LLP

(57) ABSTRACT

Systems and methods are described for authenticating qualifications to prevent fraud. A server computing device may be configured to issue qualifications on behalf of a first entity, in which such qualifications are stored or recorded on the blockchain via a smart contract. More specifically, a second entity may request the issuance of a qualification by fulfilling one or more conditions that are associated with the qualification. In response, the server computing device may generate a smart contract on the blockchain that executes upon the fulfillment of the one or more conditions. The execution of the smart contract causes a qualification to be stored on the blockchain, which is associated with the second entity.

20 Claims, 12 Drawing Sheets

SYSTEMS AND METHODS FOR AUTHENTICATING QUALIFICATIONS TO PREVENT FRAUD

TECHNICAL FIELD

This application relates generally to systems and methods, including computer program products, for verifying qualifications of entities to prevent fraud.

BACKGROUND

In this hypercompetitive world, more and more individuals are competing for a limited number of positions, whether it is applying to a prestigious university, running for election as a politician, or applying for a position at a prominent organization. Indeed, many are becoming desperate in their attempts to gain these positions via fraudulent means. One approach in which individuals (or applicants) may perform fraud is by falsifying their records in order to have an edge over the competition. For example, there have been known cases in which applicants deceived their prospective employers by claiming (on their resume or curriculum vitae) to have a Doctor of Philosophy in the biological sciences and were able to successfully obtain the position because of such deception. There have also been cases in which individuals dishonestly listed multiple professional certificates in the information technology (IT) space on their resume (which they never obtained), but nevertheless were able to obtain employment. Likewise, covert agents from competing nation-states may also deceive their prospective employers (e.g., in the Federal government) into hiring them based on fake credentials, thereby presenting a national security issue.

In fact, such fraud extends even to positions in Congress, in which a relatively recent headline exposed a member of Congress for his deception during his election campaign. Such member falsified his educational history by claiming that he received undergraduate and graduate degrees in business from two top-ranking well-known universities. Likewise, the congressman further falsified his employment history to recite working at prominent investment banks. His "stellar" record (along with other false claims regarding his background) led in part to his election as a member of Congress. As is clear from this headline, this is a serious problem that extends even to leadership positions in government.

While there are some ways to reduce fraud, such as requiring physical or electronic versions of documents (e.g., transcripts, diplomas, or certificates), such documents can be forged. As such, providing such documents may not always prevent fraud from occurring. In addition, the process for obtaining such documents is cumbersome as well. Depending on the institution, an official transcript must always be requested (sometimes with a fee) and it may take time for the transcript to be mailed out. Further, diplomas are usually large, and it is not always possible to conveniently scan them to make an electronic copy.

Likewise, the submission of such documents is also an inconvenience as the individual needs to provide each document (which can be many) in order to certify that the individual truly earned the credentials corresponding to such documents. Whether they are electronic or physical copies, the individual is forced to provide such copies, thereby creating an unnecessary burden to the individual (especially for highly qualified individuals, who may have achievements in many areas, and therefore many documents). As such there remains a need for a better process to ensure that individuals cannot fraudulently falsify their credential history and allow honest individuals to provide their credentials in a convenient manner.

SUMMARY

The present disclosure, in one aspect, a computing (or computer) system for validating the qualifications of an entity to prevent fraud, the system comprising computer-executable instructions to: receive instructions from a first entity to generate a smart contract between the first entity and a second entity, the second entity being provided with a qualification token upon fulfillment of one or more conditions associated with the smart contract, wherein the qualification token is a non-fungible token that represents a qualification provided by the first entity; generate a qualification image that represents the qualification in a graphical format, wherein the qualification image is generated to be uniquely associated with the first entity; transmit the smart contract for recordation in a blockchain; transmit an execution instruction to the blockchain to trigger the smart contract after receiving a fulfillment notification indicating that the second entity has fulfilled the one or more conditions, wherein execution of the smart contract provides the second entity with a qualification token, and wherein the qualification token comprises metadata including qualification information, a reference to the qualification image, and a qualification identifier; and generate an entity profile of the second entity by accessing the blockchain to retrieve the qualification token associated with the first entity, the retrieval being performed at least in part by using qualification identifier, wherein the entity profile displays the qualification information and the qualification image.

The computer executable instructions cause the processor to perform further operations to: generate an attestation in connection with the qualification, the attestation indicating that the qualification has been validly provided to the second entity by the first entity, wherein the attestation is digitally signed by the first entity; and transfer the attestation to the second entity via the blockchain, the attestation being stored on the blockchain, the attestation being retrieved from the blockchain to be displayed on the entity profile when the entity profile is generated, wherein the attestation is configured to be verifiable by a third entity by matching the digital signature to the first entity.

The computer executable instructions cause the processor to perform further operations to: generate a revocation of the attestation associated with the qualification token after receiving revocation instructions from the first entity, the attestation indicating that the qualification provided to the second entity has been revoked by the first entity, wherein the revocation is digitally signed by the first entity; and transfer the revocation to the second entity via the blockchain, the revocation being stored on the blockchain, wherein the revocation is retrieved from the blockchain to be displayed, along with a revocation timestamp, on the entity profile when the entity profile is accessed. The revocation instructions are generated by the first entity after determining that at least one of the one or more conditions has been fraudulently fulfilled by the second entity, and wherein the revocation indicates which one of the one or more conditions has been fraudulently fulfilled on the entity profile. The computer executable instructions cause the processor to perform further operations to: determine that the qualification includes an expiration date, wherein the expiration date indicates a date in which the qualification becomes invalid; and generate an expiration mechanism that activates when the expiration date is reached by transmitting an expiration notification. The computer executable instructions cause the processor to perform further operations to: generate an expiry indicator with respect to the attestation associated with the qualification token after receiving the expiration notification indicating that the expiration date associated with the qualification has been reached; and transfer the expiry indicator to the second entity via the blockchain, the expiry indicator being stored on the blockchain, wherein the expiry indicator is retrieved from the blockchain to be displayed, along with an expiration timestamp, on the entity profile when the entity profile is accessed. The first entity provides one or more renewal conditions for renewing the expired certificate, and wherein the computer executable instructions cause the processor to perform further operations to: receive a renewal notification from the second entity indicating that the qualification is to be renewed due to fulfillment of the one or more renewal conditions; generate an updated attestation indicating that the qualification has been validly renewed by the first entity, wherein the updated attestation is digitally signed by the first entity; and transfer the updated attestation to the second entity via the blockchain, the updated attestation being stored on the blockchain, wherein the updated attestation is retrieved from the blockchain to be displayed, along with a renewal timestamp, on the entity profile when the entity profile is accessed.

The present disclosure, in another aspect, features a non-transitory computer-readable medium including computer-executable instructions that, when executed by a computing device, causes the computing device to: receive instructions from a first entity to generate a smart contract between the first entity and a second entity, the second entity being provided with a qualification token upon fulfillment of one or more conditions associated with the smart contract, wherein the qualification token is a non-fungible token that represents a qualification provided by the first entity; generate a qualification image that represents the qualification in a graphical format, wherein the qualification image is generated to be uniquely associated with the first entity; transmit the smart contract for recordation in a blockchain; transmit an execution instruction to the blockchain to trigger the smart contract after receiving a fulfillment notification indicating that the second entity has fulfilled the one or more conditions, wherein execution of the smart contract provides the second entity with a qualification token, and wherein the qualification token comprises metadata including qualification information, a reference to the qualification image, and a qualification identifier; and generate an entity profile of the second entity by accessing the blockchain to retrieve the qualification token associated with the first entity, the retrieval being performed at least in part by using qualification identifier, wherein the entity profile displays the qualification information and the qualification image.

The qualification image includes at least one of a name of the first entity, a name of the second entity, a name of the qualification associated with the qualification token, and an issue date of the qualification. The second entity is associated with two or more qualifications, and wherein the computer executable instructions cause the computing device to perform further operations to: generate a timeline in the entity profile corresponding to the second entity, wherein the timeline displays the two or more qualifications chronologically in a list, in which each qualification displayed includes the qualification information obtained from the metadata of the qualification token. The timeline includes one or more icons representing the two or more qualifications associated with the second entity, wherein activation of an icon of the one or more icons causes the display of a qualification image associated with the qualification corresponding to the icon. The one or more conditions associated with the smart contract includes a requirement to complete one or more courses, and the metadata of the reference token includes a reference to a course record indicating a performance measurement for each completed course of the one or more courses. The entity profile includes the course record for display, and wherein the course record is blocked from viewing without permission from the second entity. The permission from the second entity is in the form of a passcode, in which entry of the passcode is required before viewing the course record displayed on the entity profile.

The present disclosure, in a further aspect, features a computerized method for validating the qualifications of an entity to prevent fraud, the method comprising: receiving instructions from a first entity to generate a smart contract between the first entity and a second entity, the second entity being provided with a qualification token upon fulfillment of one or more conditions associated with the smart contract, wherein the qualification token is a non-fungible token that represents a qualification provided by the first entity; generating a qualification image that represents the qualification in a graphical format, wherein the qualification image is generated to be uniquely associated with the first entity; transmitting the smart contract for recordation in a blockchain; transmitting an execution instruction to the blockchain to trigger the smart contract after receiving a fulfillment notification indicating that the second entity has fulfilled the one or more conditions, wherein execution of the smart contract provides the second entity with a qualification token, and wherein the qualification token comprises metadata including qualification information, a reference to the qualification image, and a qualification identifier; and generating an entity profile of the second entity by accessing the blockchain to retrieve the qualification token associated with the first entity, the retrieval being performed at least in part by using qualification identifier, wherein the entity profile displays the qualification information and the qualification image. The second entity is associated with two or more qualifications, wherein each of the two or more qualifications includes the same qualification identifier, and wherein qualification images corresponding to the two or more qualifications are stored in a database. The one or more qualification tokens represent at least one of an academic degree, a professional certificate, an occupational license, and a legal authorization. The metadata further includes personally identifiable information associated with the second entity, and wherein the personally identifiable information includes at least one of name, social security number, date of birth, digital wallet address, physical address, email address, and phone number. The second entity includes at least one of an individual and a person and the first entity includes at least one of a governmental organization, a private organization, a public organization, a non-profit organization, a for-profit organization, an association, a company, a corporation, a decentralized organization, and a guild. The blockchain includes at least one of Ethereum, Bitcoin, Binance Smart Chain, Cardano, Avalanche, Tron, Doge, XRP, Aptos, Solona, Polygon, Optimism, Chainlink, or a distributed database or ledger shared among nodes of a computer network.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION

Figure 1:
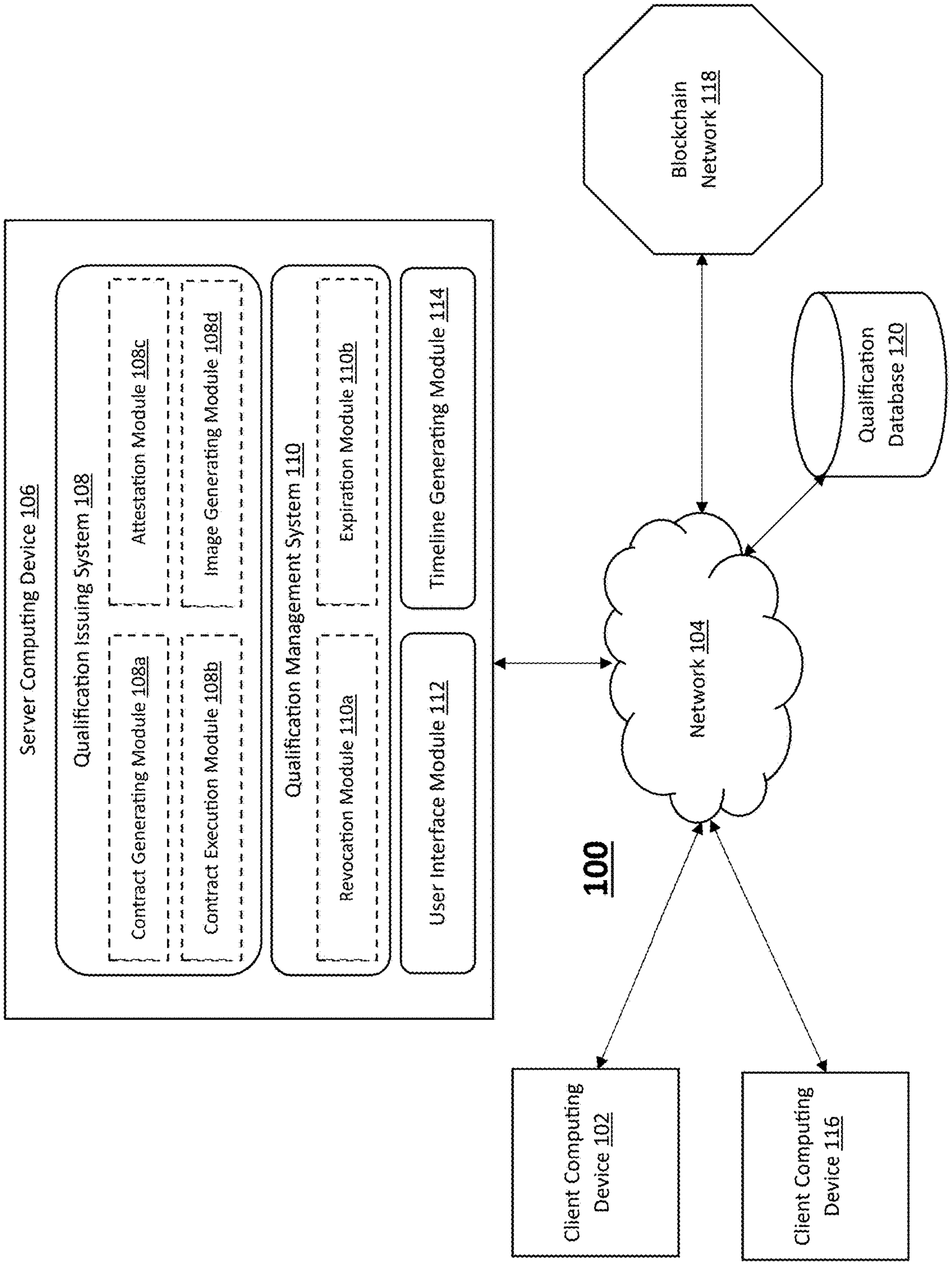
FIG. 1 is a block diagram of a system for verifying qualifications of entities to prevent fraud.

In describing preferred embodiments illustrated in the drawings, specific terminology is employed herein for the sake of clarity. However, this disclosure is not intended to be limited to the specific terminology so selected and it is to be understood that each specific element includes all technical equivalents that operate in a similar manner. In addition, a detailed description of known functions and configurations is omitted from this specification when it may obscure the inventive aspects described herein.

Various tools are discussed herein to facilitate the invention(s) disclosed herein. It should be appreciated by those skilled in the art that any one or more of such tools may be embedded in the application and/or in any of various other ways, and thus while various examples are discussed herein, the inventive aspects of this disclosure are not limited to such examples described herein.

FIG. 1 is a block diagram of a system for 100, which includes a client computing device 102, a server computing device 106, a blockchain network 114, a client computing device 116, and a qualification database 120, all of which are capable of communicating with each other via a communication network 104.

The client computing device 102 (or the client computing device 116) can be coupled to a display device (not shown), such as a monitor, display panel, or screen. For example, client computing device 102 (or the client computing device 116) can provide a graphical user interface (GUI) via the display device to a user of corresponding device that presents output resulting from the methods and systems described herein and receives input from the user for further processing. Further, the client computing device 102, may include one or more applications that provide additional functionality to the client computing device 102. For example, the client computing device 102 may include a browser application that allows access to the services provided by devices on system 100, via a website, which can be reached by entering a uniform resource locator (URL). Exemplary client computing device 102 (or the client computing device 116) include but is not limited to desktop computers, laptop computers, tablets, mobile devices, smartphones, smart watches, Internet-of-Things (IoT) devices, and internet appliances. It should be appreciated that other types of client computing devices that are capable of connecting to components of the system 100 can be used without departing from the scope of invention. Although FIG. 1 depicts a single client computing device 102 (or a single client computing device 116), it should be appreciated that system 100 can include any number of client computing devices 102 (or any number of client computing devices 116).

The communication network 104 can be a local area network, a wide area network, a cellular network, or any type of network such as an intranet, an extranet (for example, to provide controlled access to external users, for example through the Internet), a private or public cloud network, the Internet, etc., or a combination thereof. In addition, the communication network 104 preferably uses TCP/IP (Transmission Control Protocol/Internet Protocol), but other protocols such as SNMP (Simple Network Management Protocol) and HTTP (Hypertext Transfer Protocol) can also be used. In some embodiments, the communication network 104 is comprised of several discrete networks and/or sub-networks (e.g., cellular to Internet).

The server computing device 106 is a device including specialized hardware and/or software modules that execute on a processor and interact with memory modules of the server computing device 106, to transmit data to other components of the system 106, and to receive data from other components of the system 100, as described herein. The server computing device 106 includes several systems, frameworks, stores, and computing modules that execute on one or more processors of the server computing device 106. For example, the server computing device 106 includes a qualification issuing system 108, a qualification management system 110, a user interface module 112, and a timeline generating module 114. The qualification issuing system includes a contract generating module **108*a*, a contract execution module 108*b*, an attestation module 110*c*, and an image generating module 108*d*. The qualification management system 110 includes a revocation module 110*a* and an expiration module 110*b*. In some embodiments, the contract generating module 108*a*, the contract execution module 108*b*, the attestation module 110*c*, and the image generating module 108*d*, the revocation module 110*a*, and the expiration module 110*b* are specialized sets of computer software instructions programmed onto one or more dedicated processors in server computing device 106** and can include specifically-designated memory locations and/or registers for executing the specialized computer software instructions.

Although the contract generating module **108*a*, the contract execution module 108*b*, the attestation module 110*c*, and the image generating module 108*d*, the revocation module 110*a*, the expiration module 110*b*, the user interface module 112, and the timeline generating module 114 are shown in FIG. 1 as executing within the same server computing device 106, in some embodiments the functionality of the contract generating module 108*a*, the contract execution module 108*b*, the attestation module 110*c*, and the image generating module 108***d*, the revocation module 110*a*, the expiration module 110*b*, the user interface module 112, and the timeline generating module 114 can be distributed among a plurality of server computing devices. As shown in FIG. 1, the server computing device 106 allows the contract generating module 108*a*, the contract execution module 108*b*, the attestation module 110*c*, and the image generating module 108*d*, the revocation module 110*a*, the expiration module 110*b*, the user interface module 112, and the timeline generating module 114 to communicate with each other in order to exchange data for the purpose of performing the described functions.

It should be appreciated that any number of computing devices, arranged in a variety of architectures, resources, and configurations (e.g., cluster computing, visual computing, cloud computing) can be used without departing from the scope of the invention. Exemplary functionality of the contract generating module 108*a*, the contract execution module 108*b*, the attestation module 110*c*, and the image generating module 108*d*, the revocation module 110*a*, the expiration module 110*b*, the user interface module 112, and the timeline generating module 114 are described in detail below.

The blockchain network 118 is a network that may be a decentralized and distributed database that maintains a continuously growing list of ordered records, in the form of blocks (e.g., public ledger) that are linked using cryptography. Each block may contain a cryptographic hash of the previous block, a timestamp, and transaction data. The block cannot be altered retroactively without the alteration of all subsequent blocks and the consensus of the network. The blockchain network 118 may further include one or more nodes (e.g., computing devices) that each store a complete copy of the blockchain. When a new block is added to the existing blockchain, the one or more nodes are updated to reflect the new block in the blockchain. For example, the blockchain network includes at least one of Ethereum, Bitcoin, Binance Smart Chain, Cardano, Avalanche, Tron, Doge, XRP, Aptos, Solona, Polygon, Optimism, Chainlink, and a distributed database or ledger shared among nodes of a computer network.

The qualification database 120 is a computing device (or, in some embodiments, may be a set of computing devices) that is configured to provide, receive and store various types of qualifications or anything associated with qualifications (e.g., documents, images, attestations, revocations, expiry indicators, tokens, etc.). In some embodiments, all or a portion of the qualification database 120 is accessible via the communication network 104. In addition, it should be noted that the qualification database 120 may be encrypted to prevent data from being compromised.

Figure 2:
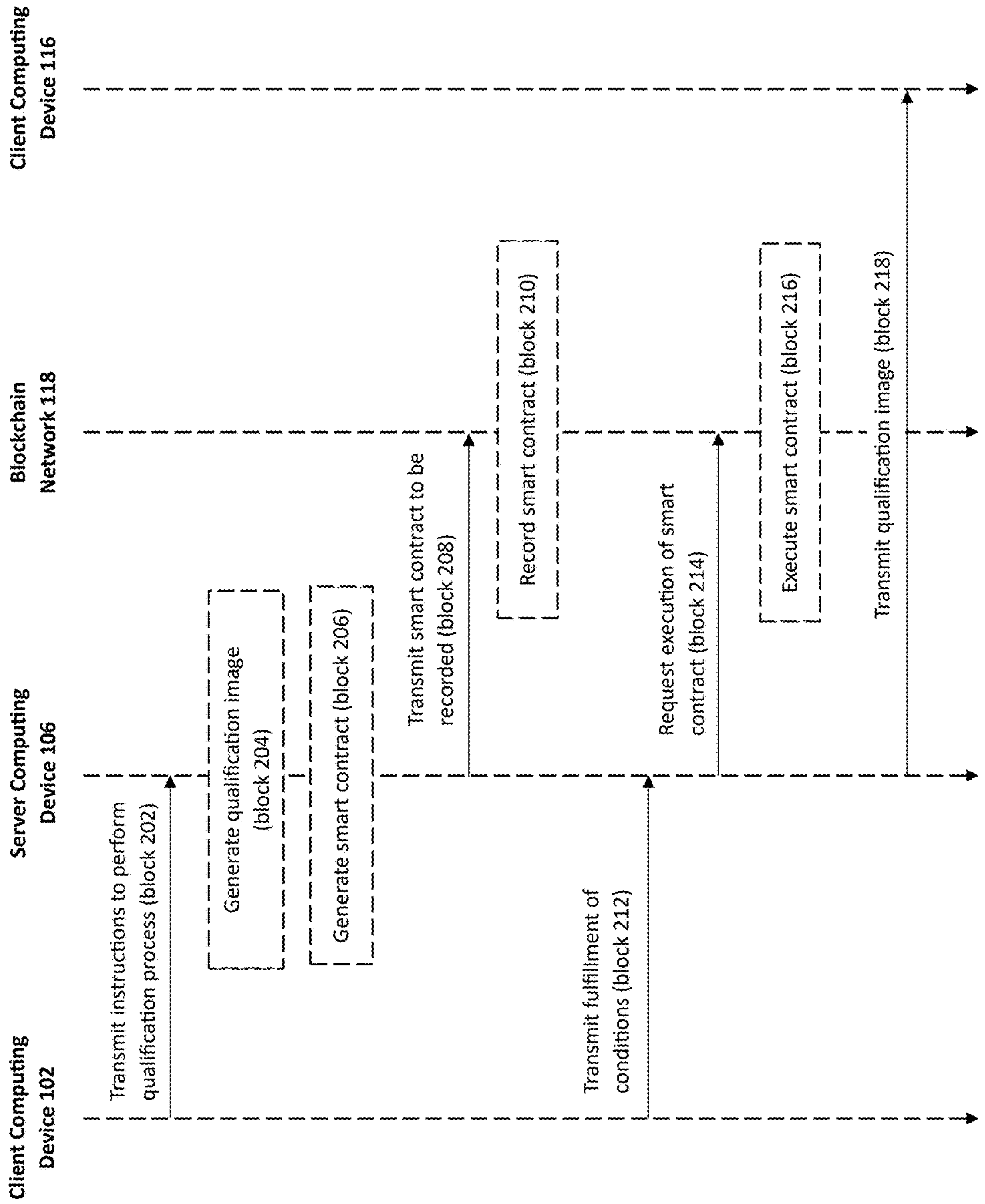
FIG. 2 is a system flow diagram for issuing qualifications that are verifiable to prevent fraud.

FIG. 2 illustrates an exemplary flow diagram corresponding to the system 100 of FIG. 1, in which the client computing device 102, the server computing device 106, the blockchain network 108, and the client computing device 116, communicate with each other to perform one or more actions. At block 202, the client computing device transmits instructions to the server computing device 106 to perform a qualification process. At block 204, the server computing device 106 generates a qualification image. At block 206, the server computing device 106 generates a smart contract including one or more conditions that, once fulfilled, causes the smart contract to execute (e.g., trigger execution of smart contract). The execution of the smart contract causes an attestation to be recorded on the blockchain network 118 that an entity associated with the client computing device 116 has fulfilled the conditions required for receiving the corresponding qualification. At block 208, the server computing device 106 transmits the smart contract to be recorded on blockchain network 108. At block 210, the blockchain network 118 records the smart contract. At block 212, the client computing device 102 transmits a notification (or instruction) that the conditions associated with the smart contract have been fulfilled. At block 216, the blockchain network 118 executes the smart contract, which causes the attestation to be recorded on the blockchain network 118. At block 218, the server computing device 106 transmits the qualification image to the client computing device 116.

Example Routine for Issuing Qualifications

Figure 14:
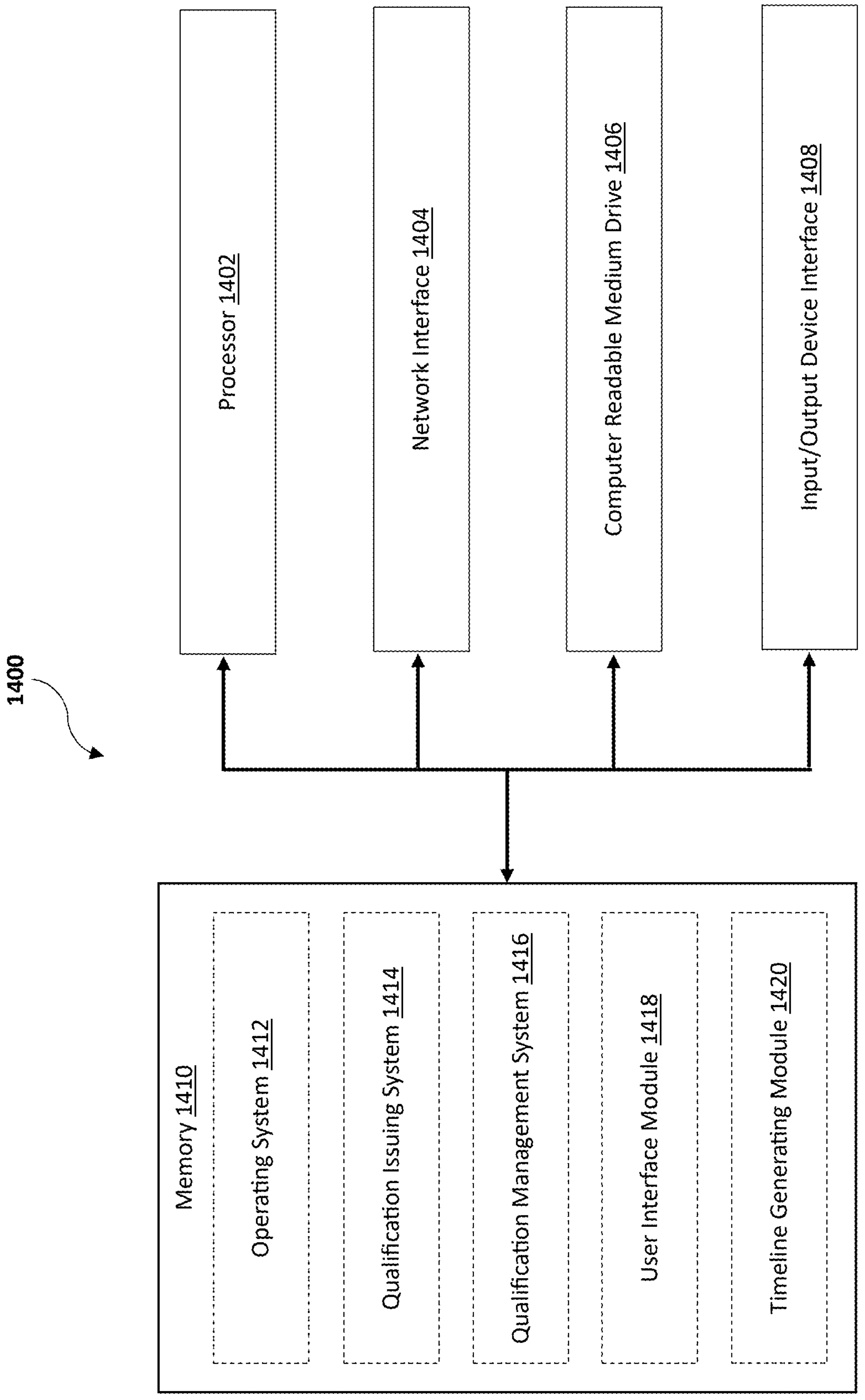
FIG. 14 is a diagram of an illustrative computing system.

When a routine described herein (i.e., 300, 500, 600, 800, 900, 1000, 1100) is initiated, as set of executable program instructions stored on one or more non-transitory computer-readable media (e.g., hard drive, flash memory, removable media, etc.) may be loaded into memory (e.g., random access memory or RAM) of a computing device, such as the computing device 1400 shown in FIG. 14, and executed by one or more processors. In some embodiments, the routine 300, 500, 600, 800, 900, 1000, 1100, or portions thereof may be implemented on multiple processors, serially or in parallel.

Figure 3:
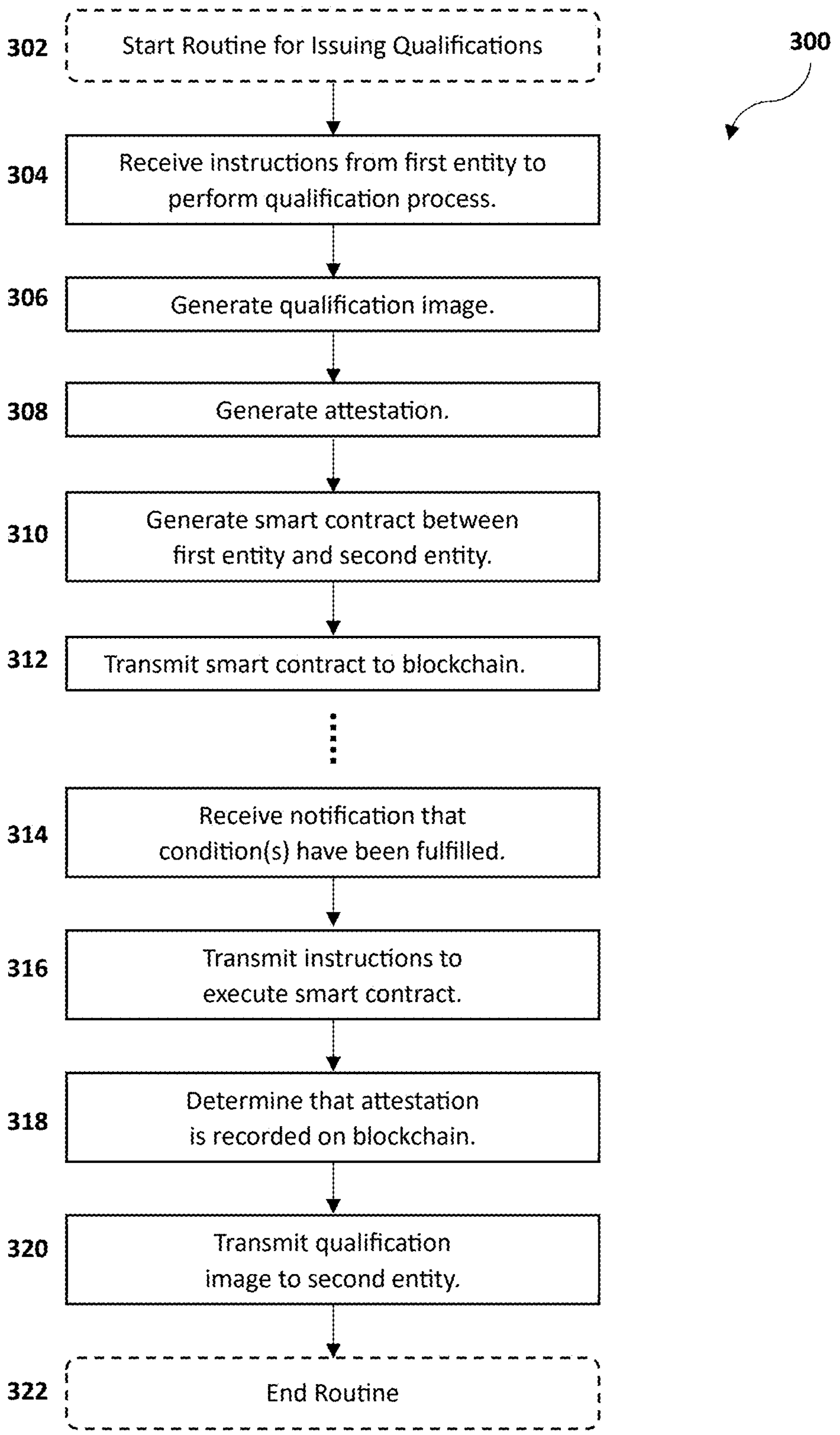
FIG. 3 is a flow diagram of a computerized method for issuing qualifications.

FIG. 3 illustrates example routine 300 (beginning at block 302) for issuing qualifications, that is performed, for example, by the qualification issuing system 108. At block 304, the qualification issuing system 108 receives instructions (e.g., from a user, associated with first entity, that is operating the client computing device 102) to perform a qualification process, in which a second entity receives a qualification provided by the first entity. The first entity provides qualifications to the second entity. For example, the first entity may be a governmental organization, a private organization, a public organization, a non-profit organization, a for-profit organization, an association, a company, a corporation, a decentralized organization, or a guild. The second entity may be an individual such as, but not limited to, a person, a student, or a job applicant. In some embodiments, the instructions provided at block 302 may include the type of qualification to be issued, the name of the second entity (or second entities) to receive the qualification, and/or a digital wallet address associated with the second entity.

The qualification may be an indicator that a second entity (e.g., individual) has fulfilled one or more criteria (or conditions) set forth by the providers of the qualification and, therefore, is qualified to perform a set of jobs or tasks associated with the qualification. For example, a qualification may be in the form of an academic degree that is provided by a university (e.g., first entity) to an individual (e.g., second entity) after he or she, for example, has earned a predetermined number of credits set forth by the university (e.g., fulfillment of one or more criteria). In another example, a qualification may include at least one of an academic degree (e.g., high school diploma, Bachelor, Master, Doctor of Philosophy), a professional certificate (Fidelity Investment's Digital Marketing certificate, Cisco Certified Network Associate certificate, CompTIA A+ certification), an occupational license (e.g., real estate agent, lawyer), and a legal authorization (e.g., driver's license).

In some embodiments, an academic degree may be a qualification provided by schools (e.g., higher education), a professional certificate may be provided by any type of organization (e.g., corporation) to demonstrate that the individual (from the perspective of the organization) has knowledge in a specific area or is qualified to perform certain tasks or functions (but may not necessarily have any legal authority), an occupational license may be a qualification provided by the government to allow an individual practice a particular profession, and a legal authorization may be a qualification provided by the government the privilege of performing certain tasks or functions.

In other embodiments, a user associated with the first entity may be operating the client computing device 102 (as shown in FIG. 1) in which the first entity (via the user) may utilize the services of the server computing device 106 to issue qualifications. More specifically, the first entity may receive a request from a second entity (e.g., via a website provided by the second entity) for a qualification (or one or more qualifications) provided by the first entity. For example, the first entity may operate an online website that offers multiple courses, such that completion of one of the courses provides a professional certificate. The second entity may be operating the client computing device 116 to access such services (e.g., website) provided by the first entity. In some embodiments, the user interface module 112 of the server computing device 106 generates a user interface on the client computing device 102 (e.g., via an app or software installed on the client computing device 102) to allow interaction between the user (via the client computing device 102) and the server computing device 106. As such, since the first entity is using the services of the server computing device 106 to issue such qualifications, the first entity may transmit instructions to the service computing device 106 to initiate the process for issuing a qualification.

At block 306, the image generating module 108*d* of the qualification issuing system 108 generates a qualification image. The format of the qualification image may include, but is not limited to PNG, TIFF, JPEG, BMP, PDF, and/or GIF. The qualification image corresponds to the qualification, and may include a name of the first entity, a name of the second entity, a name of the qualification, and an issue date of the qualification. In some embodiments, the qualification image is stored in the server computing device 106. In other embodiments, the qualification image is stored in the qualification database 120. For example, the qualification image may be a diploma corresponding to a bachelor's degree, in which the qualification image may include the name of the university, the name of the recipient of the bachelor's degree, and the issue date of the diploma. The qualification image may also include other information such as (but not limited to) the expiration date of the qualification, personal identifiable information (PII) of the second entity (e.g., name, email address, physical address, digital wallet address, social security number, date of birth, place of birth, citizenship), an identifier (e.g., U.S. Patent Agent No.) associating the second entity with the qualification, a signature (e.g., of an authorized employee or personnel of the first entity) officiating the qualification, or other non-functional information configured to enhance the prestige of the qualification. The qualification image may also include other graphical images, such as (but not limited to) the insignia of the first entity (e.g., coat of arms of the university), a seal of the first entity (for visual authentication purposes), or other non-functional images configured to enhance the aesthetics of the qualification image. In some embodiments, the qualification image is generated from a qualification template (or schema) that is stored in the server computing device 106 beforehand. For example, the first entity may provide a qualification that is intended to be (or has been in the past) issued to many second entities, such that the qualification image is the same for each one that is provided to the second entities. Consequently, the difference may only be, for example, the name of the second entity.

At block 308, the attestation module 108*c* of the qualification issuing system 108 generates an attestation. The attestation may be a statement that is digitally signed by the first entity (e.g., by using a private key of the first entity) to indicate that the qualification was indeed issued by the first entity. Consequently, any third-party may verify the digitally signed attestation by using, for example, the public key associated with the first entity. In other embodiments, the qualification issuing system 108 may provide functionality to allow the user of the client computing device 102 to access the private key associated with the first entity to digitally sign the attestation. In some embodiments, the attestation module 108*c* of the qualification issuing system 108 may digitally sign the attestation on behalf of the first entity (e.g., the first entity may permit such action) thereby automating the process of generating (and transmission) of the attestation.

In some embodiments, the attestation may include, but is not limited to, the first entity, the second entity, the name or type of qualification, a first digital wallet address associated with the first entity, a second digital wallet address associated with the second entity, a message, and a qualification identifier, an expiration date (of the qualification), and/or a revocation indicator (to demonstrate whether the qualification is revocable). The qualification identifier may be unique to the second entity and the qualifications (or attestations, revocations or renewals) that were issued in connection with the second entity (e.g., via the routines 300, 500, 600, 800, 900, and 1000). In other words, when searching on a blockchain, for example, for qualifications (or attestations) associated with a specific second entity, the qualification identifier quickly allows for results that include qualifications (or attestations, revocations or renewals) associated with the specific second entity. As such, each qualification (or attestations, revocations or renewals) issued for the specific second entity (e.g., via the routine 300) may have the same qualification identifier.

In some embodiments, the message may be a description of the qualification in natural language format (e.g., "This qualification allows you to practice law in Massachusetts only"). In other embodiments, the message may include links (e.g., uniform resource locator (URL)) to one or more databases (e.g., qualification database 120 or third-party database). For example, as discussed previously, the qualification image may be stored in the qualification database 120. As such, a link may be included in the attestation to link to the corresponding qualification image. In another example, the qualification may be associated with an academic degree that is associated with a diploma (e.g., qualification image) and a transcript (e.g., a list of courses and their corresponding measurements of performance, such as grades). As such, there may be links in the attestation corresponding to each of the diploma and the transcript. It should be noted that the diploma may be pre-generated (since it is not likely to change due to the information being static). However, the transcript may change over time (e.g., courses changing, or new courses being added). Regardless, the link may still be directed to the same file (corresponding to the transcript) stored on the database. As such, even if the contents of the file may change or be modified, the file is at the same location to which the link is pointing.

At block 310, the contract generating module 108*a* generates a smart contract. A smart contract may take the form of a contract (e.g., an agreement between two or more parties) that is transmitted to a blockchain to be stored. The smart contract may include the attestation, such that execution of the smart contract causes the attestation to be stored or recorded on the blockchain. In addition, the smart contract may be digitally signed by the first entity. For example, the smart contract may identify the first entity and the second entity as parties to the contract. In another example, the smart contract may be written in one or more programming languages (e.g., Solidity, Vyper, Rust, Yul, Python, Java, JavaScript, C++). The smart contract may automatically be executed after one or more terms or conditions (associated with the smart contract) are fulfilled. In some embodiments, the smart contract is generated from a template (or schema), such that the fulfillment conditions are the same for each one. For example, the smart contract for university students, who are of the same class year, may all substantially be the same. In other embodiments, the qualification issuing system 108 may provide functionality to allow the user of the client computing device 102 to access the private key associated with the first entity to digitally sign the smart contract. In some embodiments, the contract generating module 108*a* of the qualification issuing system 108 may digitally sign the smart contract on behalf of the first entity (e.g., the first entity may permit such action) thereby automating the process of generating (and transmission) of the smart contract.

At block 314 (e.g., after an indeterminant amount of time has passed), the conditions of the qualification may have been fulfilled. For example, the conditions for the qualification may be passing an exam with a score higher than a minimum designated score or the completion of a total number of credits in connection with an academic degree. At block 318, the qualification issuing system 108 may transmit instructions to execute (or trigger execution of) the smart contract stored on the blockchain network 118. As discussed previously, execution of the smart contract may cause the attestation included in the smart contract to be stored or recorded on the blockchain network 118. In some embodiments, the user of the client computing device 102 may receive notification of such fulfillment via another service or software installed or accessed via the client computing device 102. As such, the user of the client computing device 102 may instruct the qualification issuing system 108 to transmit instructions to execute the smart contract.

In another embodiment, the fulfillment of the conditions may be automatically transferred to the client computing device 102. For example, the second entity may have taken an exam electronically accessed using software (e.g., associated with the first entity or a third-party service) or a browser on a computer, in which the second entity is immediately informed of the results after completion of the exam (automatically by the software). Thus, in the case that the second entity passes the exam, the software (providing the exam) may notify the qualification issuing system 108 automatically. In turn, the qualification issuing system 108 may transmit instructions to execute the smart contract on the blockchain network 118.

In yet a further embodiment, the smart contracts may be configured to access an oracle at a set time interval or at a set date (e.g., on graduation day). The oracle may determine whether the conditions corresponding to the smart contract have been fulfilled. In case that the oracle determines that the conditions have been fulfilled, the oracle may notify the smart contract of such fulfillment, thereby causing the smart contract to execute. Therefore, it should be noted that, in the case that an oracle is used to determine whether to execute the smart contract, blocks 314 and 316 may not necessarily be required in the routine 300.

Figure 4:
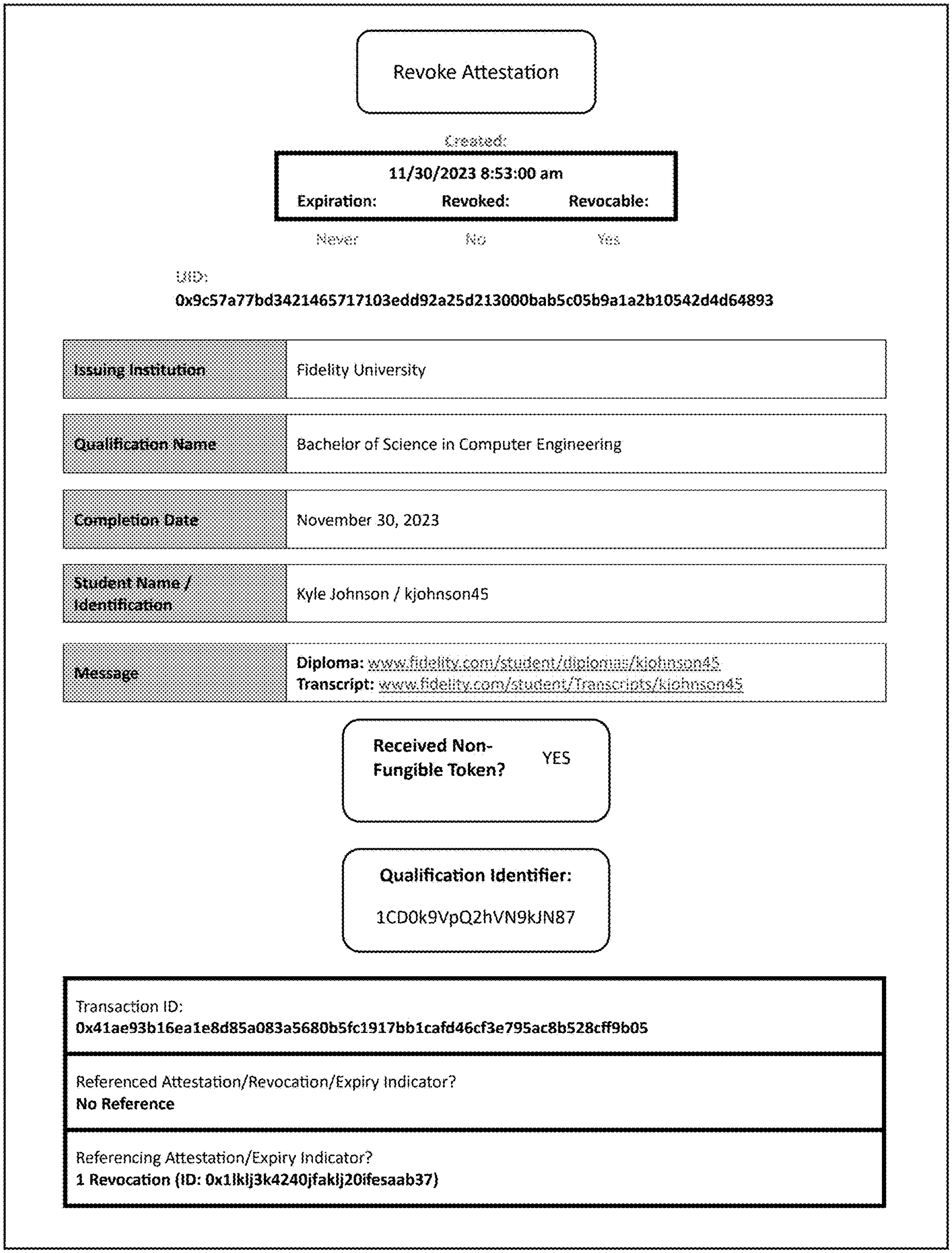
FIG. 4 is an example diagram illustrating an attestation associated with a qualification issued by the system.

At block 318, the qualification issuing system 108 determines whether attestation has been stored or recorded in the blockchain network 118 by accessing the blockchain network 118. FIG. 4 shows an example of an attestation (stored in the blockchain network 118) that is accessed from the blockchain network 118 (e.g., via the qualification issuing system 108) and that is displayed to a user (e.g., of the client computing device 116) on, for example, a browser or app (or software) via the user interface module 112 is shown in FIG. 4. It should be noted that, while the attestation (e.g., in its entirety) is displayed to the user, there may be other information or options (e.g., "Revoke Attestation" or Received Non-Fungible Token?") that is not part of the attestation, but generated (e.g., by the user interface module 112) and displayed for the benefit of the user viewing the attestation (e.g., on a browser on the client computing device 112).

As illustrated in FIG. 4, the attestation includes a unique identifier that uniquely (specifically) identifies the attestation (e.g., "0x9c5 . . . 64893"), the first entity ("Fidelity University"), the second entity ("Kyle Johnson"), the qualification ("Bachelor of Science in Computer Engineering"), a creation date (e.g., the issuing date of the qualification) ("11/30/2023 8:53:00 am"), a qualification identifier ("1CD..N87"), a message ("Diploma . . . ", "Transcript . . . "), an expiration date ("Never"), revocation status ("No"), revocable status ("Yes"), transaction identifier ("0x41a . . . f9b05"). In some embodiments, the attestation shown in FIG. 4 may also include other information including a first digital wallet address associated with the first entity (e.g., "Fidelity University") and a second digital wallet address associated with the second entity (e.g., "Kyle Johnson").

At block 322, the qualification issuing system 108 transmits the qualification image to the second entity. In some embodiments, the qualification issuing system 108 may transmit the qualification image after determining that the attestation is recorded on the blockchain network 118. It should be noted that in other embodiments, the qualification issuing system 108 may transmit the qualification image to the second entity after transmitting instructions to execute the smart contract, thereby making it possible to exclude block 318 in the routine 300. In further embodiments, the qualification issuing system 108 may automatically transmit the qualification image to the second entity using an email address of the second entity. This may be performed by attaching the qualification image as a file or as a link (e.g., URL linked to the database) in the email. In another embodiment, the qualification issuing system 108 may cause the qualification image to be physically printed to a printing device (to be mailed to the second entity). In yet another embodiment, the qualification issuing system 108 may generate a qualification token that includes metadata in a link to the database having the qualification image and/or transcript. The qualification issuing system 108 may transmit the qualification token to a digital address of the second entity via the blockchain network 118. In some embodiments, the attestation and qualification token may be transmitted (e.g., by the qualification issuing system 108) to be stored in the qualification database 120. At block 322, the routine ends.

Example Routine for Performing Attestation

When a routine described herein (i.e., 300, 500, 600, 800, 900, 1000, 1100) is initiated, as set of executable program instructions stored on one or more non-transitory computer-readable media (e.g., hard drive, flash memory, removable media, etc.) may be loaded into memory (e.g., random access memory or RAM) of a computing device, such as the computing device 1400 shown in FIG. 14, and executed by one or more processors. In some embodiments, the routine 300, 500, 600, 800, 900, 1000, 1100, or portions thereof may be implemented on multiple processors, serially or in parallel.

Figure 5:
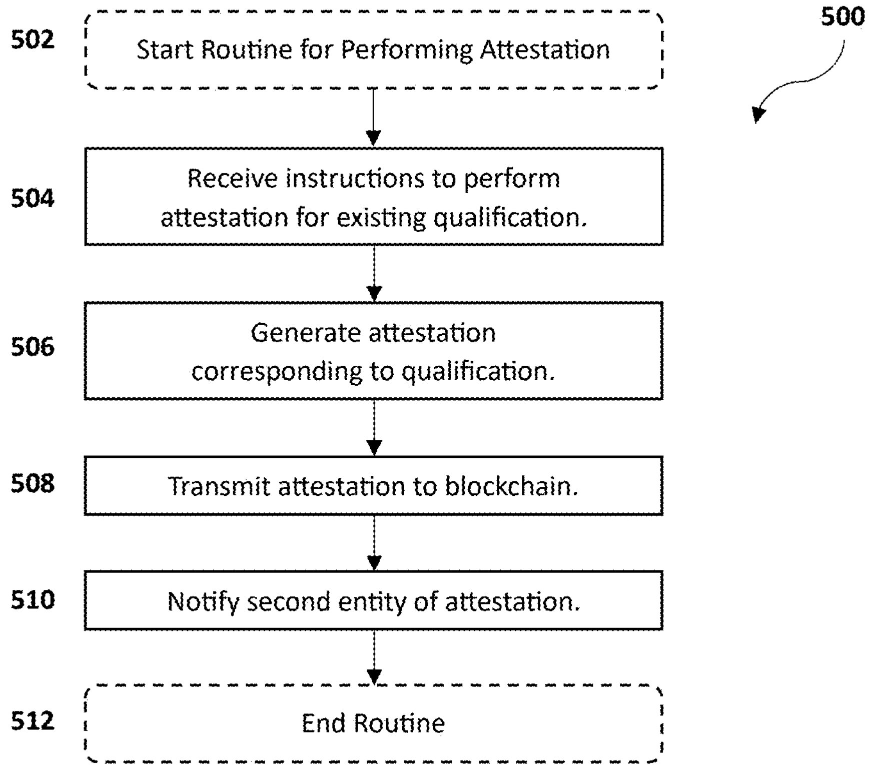
FIG. 5 is a flow diagram of a computerized method for performing attestation.

FIG. 5 illustrates example routine 500 (beginning at block 502) for performing attestations, that is performed, for example, by the qualification issuing system 108. At block 504, the qualification issuing system 108 may receive instructions to perform an attestation for an existing qualification (including existing qualification image) associated with a second entity. It may be that the qualifications were issued to their recipients (e.g., second entities) before implementation of the qualification issuing system 108. In other words, while there are existing qualifications issued by the first entity to the second entity, there may not necessarily be corresponding attestations on the blockchain network 118. Therefore, a user (e.g., of the client computing device 102) may instruct the attestation module 108*c* to generate an attestation for the existing qualification.

At block 506, the attestation module 106*c* may generate an attestation. The attestation may include the information as mentioned supra. In some embodiments, the revocation is digitally signed by the first entity (e.g., using the private key of the first entity). The qualification issuing system 108 may provide functionality to allow the user of the client computing device 102 to access the private key associated with the first entity to digitally sign the attestation. In further embodiments, the private key may be linked to an ENS (Ethereum Name Service) domain of the first entity. In other embodiments, the attestation may include a link to an existing qualification image and/or existing transcript. For example, the attestation module 106*c* may automatically obtain the links to the qualification image and/or existing transcript automatically (e.g., by searching the qualification database 120). At block 508, attestation module 106*c* transmits the attestation to the blockchain network 118. In some embodiments, the qualification issuing system 108 may generate a qualification token that includes metadata in a link to the database having the existing qualification image and/or existing transcript. The qualification issuing system 108 may transmit such qualification token to a digital address associated with the second entity, via the blockchain network 118. At block 510, the second entity is notified of the attestation. For example, the qualification issuing system 108 may automatically transmit an email to the email address associated with the second entity. In some embodiments, the qualification token and/or attestation may be transmitted for storage in the qualification database 120. At block 512, the routine ends.

Example Routine for Performing Revocation

When a routine described herein (i.e., 300, 500, 600, 800, 900, 1000, 1100) is initiated, as set of executable program instructions stored on one or more non-transitory computer-readable media (e.g., hard drive, flash memory, removable media, etc.) may be loaded into memory (e.g., random access memory or RAM) of a computing device, such as the computing device 1400 shown in FIG. 14, and executed by one or more processors. In some embodiments, the routine 300, 500, 600, 800, 900, 1000, 1100, or portions thereof may be implemented on multiple processors, serially or in parallel.

Figure 6:
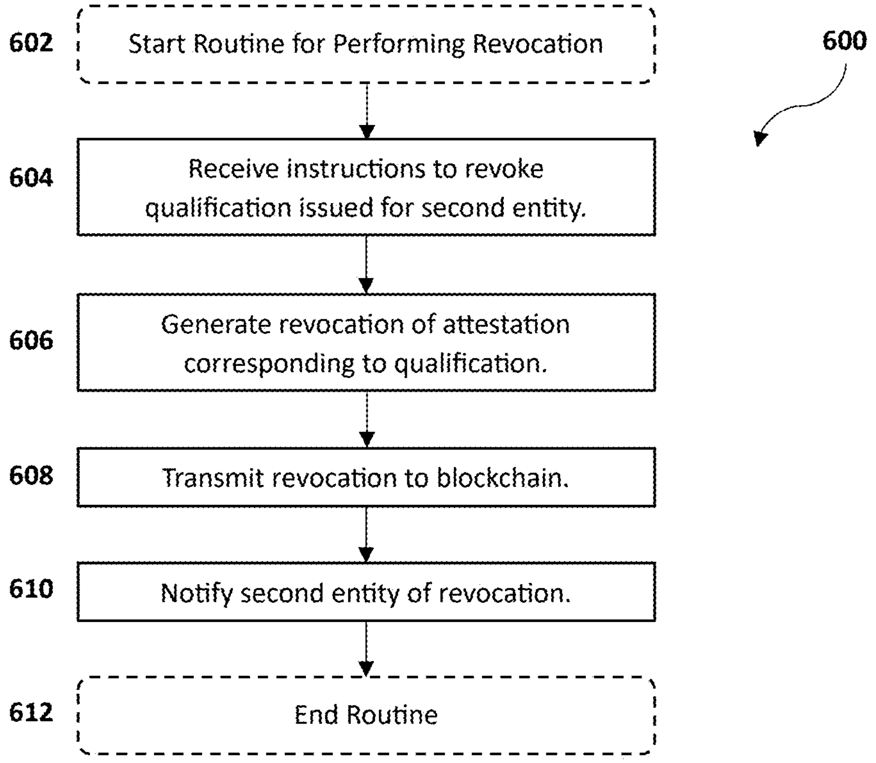
FIG. 6 is a flow diagram of a computerized method for performing revocation.

FIG. 6 illustrates example routine 600 (beginning at block 602) for performing revocations, that is performed, for example, by the qualification management system 110. At block 604, the qualification management system 110 may receive instructions to revoke a qualification issued for a second entity. More specifically, a qualification may have been issued to a second entity under the assumption that the second entity has honestly fulfilled the conditions associated with the qualification. However, there may be cases in which it is discovered (e.g., after the qualification has been issued, the attestation has been transmitted to the blockchain network 118, and the qualification token has been transmitted to the second entity via the blockchain network 118) that the second entity has dishonestly fulfilled one of the conditions for obtaining the qualification. For example, one of the conditions for obtaining the qualification may involve taking and passing the exam. However, it may be discovered later (e.g., via investigations) that the second entity has cheated on the exam. In other words, the second entity may have obtained answers through dishonest means (e.g., sneaking a smartphone into the exam site to ask a friend to answer exam questions, exchanging answers with other test takes via bathroom breaks).

The first entity may decide to take action by revoking the qualification issued to the second entity. In other words, the first entity informs the public that the second entity is no longer entitled to the qualification. However, because the attestation is permanently stored in the blockchain network 118 (in which no alteration is allowed), the first entity issues a revocation of the attestation made previously. The revocation may be similar to the attestation in terms of process for generating and transmitting to the blockchain network 118. In some embodiments, FIG. 4 illustrates a user interface that is displayed before the user of the client computing device 102 (e.g., associated with the first entity), in which the user interface includes a button ("Revoke Attestation"), which allows the user to revoke the corresponding attestation.

At block 606, the revocation module 110*a* generates a revocation of the attestation corresponding to the qualification. In some embodiments the revocation includes the same information as the attestation, as described supra with the exception that that the revocation includes information that indicates revocation of the attestation and/or timestamp of when the revocation occurred. The revocation may include the same information as the attestation for purposes of cross-referencing the attestation to ensure that the revocation is correctly revoking the right attestation. In further embodiments, the revocation is digitally signed by the first entity (e.g., using the private key of the first entity). The qualification management system 110 may provide functionality to allow the user of the client computing device 102 to access the private key associated with the first entity to digitally sign the revocation. In some embodiments, the private key may be linked to an ENS (Ethereum Name Service) domain of the first entity. In some embodiments, the revocation module 110*a* of the qualification management system 110 may digitally sign the revocation on behalf of the first entity (e.g., the first entity may permit such action) thereby automating the process of generating (and transmission) of the revocation.

In some embodiments, the revocation module 110*a* may generate a revocation image having a label over the original qualification image indicating that the qualification has been revoked (e.g., a large banner with the words "revoked" in a red color over the original qualification image). Likewise, the same label may also be placed on the original transcript as well. Such revocation image may be included in the revocation generated by the revocation module 110*a* by, for example, a link in the metadata of the revocation. It should be noted that the links may be the same ones as in the attestation (e.g., the links stay the same, but the corresponding file is modified). In further embodiments, the link to the revocation image and revoked transcript may be in the message portion of the revocation (e.g., similar to the attestation).

Figure 7:
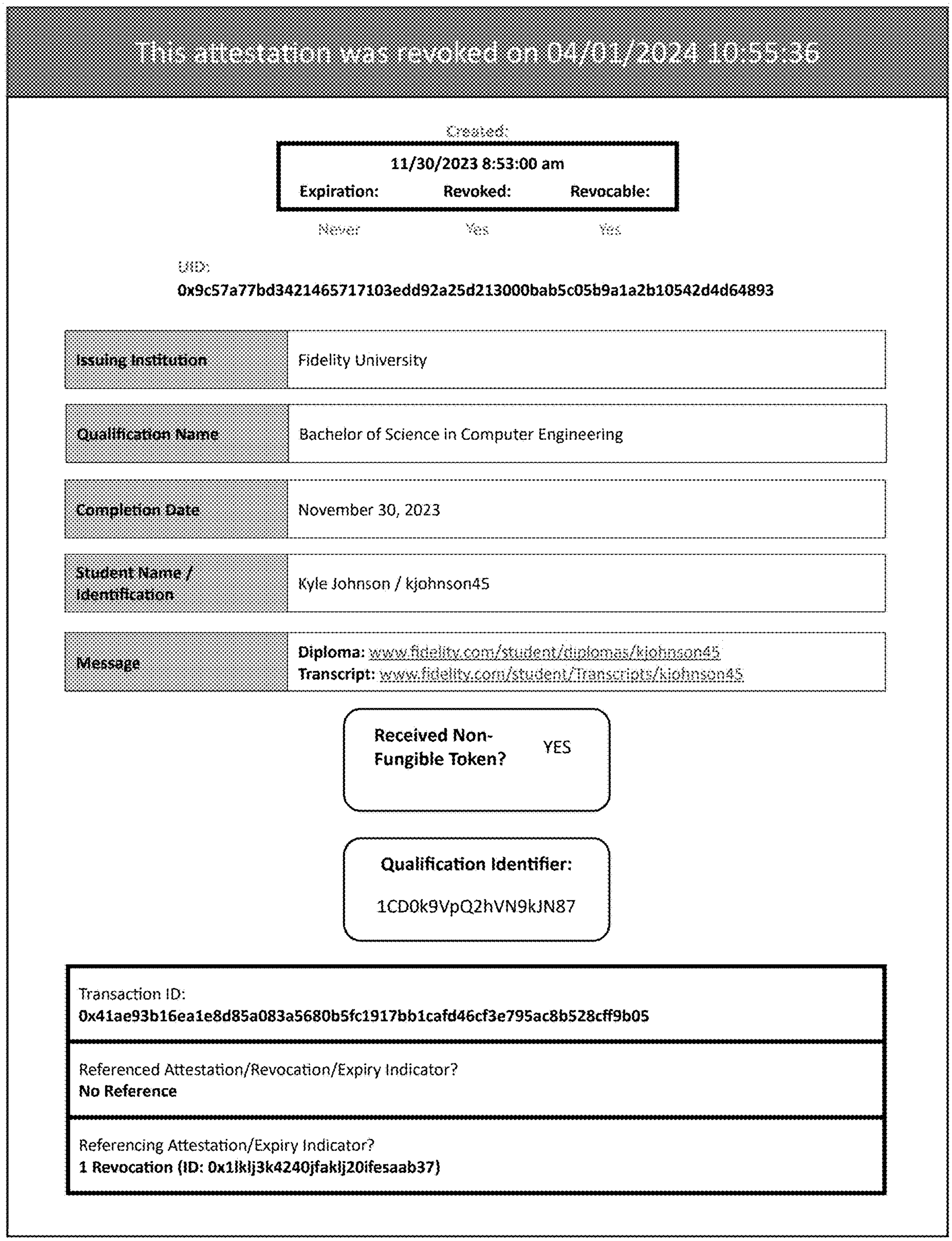
FIG. 7 is an example diagram illustrating a revocation of an attestation associated with a qualification issued by the system.

At block 608, the revocation module 110*a* transmits the revocation to be stored or recorded on the blockchain network 118. In some embodiments, the revocation is also transmitted (e.g., by the revocation module 110*a*) to be stored in the qualification database 120. At block 610, the qualification management system 110 notifies the second entity of the revocation. For example, an email may automatically be transmitted to the email address of the second entity indicating that the qualification has been revoked. In some embodiments, the email may also include a link to the revoked attestation. In other embodiments, the server computer device 108 may display (e.g., via the user interface module 112) the attestation and/or revocation in a user-friendly format to a user associated with the first entity and/or a user associated with the second entity (e.g., display upon request to access attestations by any of the users). An example is shown in FIG. 7, in which the user interface module 112 may display the attestation (corresponding to the attestation in FIG. 4). However, since such attestation was revoked, the user interface module 112 may display a label over such attestation indicating such revocation (e.g., a large banner stating "This attestation was revoked on 04/01/2024 10:55:36"). Further, as shown in FIG. 7, the user interface module 112 may also include a reference (e.g., identifier) to the revocation (e.g., in the blockchain network 118) in the interface displaying the attestation ("1 Revocation (ID:0x11k . . . aab37").

Example Routine for Processing Expired Qualifications

When a routine described herein (i.e., 300, 500, 600, 800, 900, 1000, 1100) is initiated, as set of executable program instructions stored on one or more non-transitory computer-readable media (e.g., hard drive, flash memory, removable media, etc.) may be loaded into memory (e.g., random access memory or RAM) of a computing device, such as the computing device 1400 shown in FIG. 14, and executed by one or more processors. In some embodiments, the routine 300, 500, 600, 800, 900, 1000, 1100, or portions thereof may be implemented on multiple processors, serially or in parallel.

Figure 8:
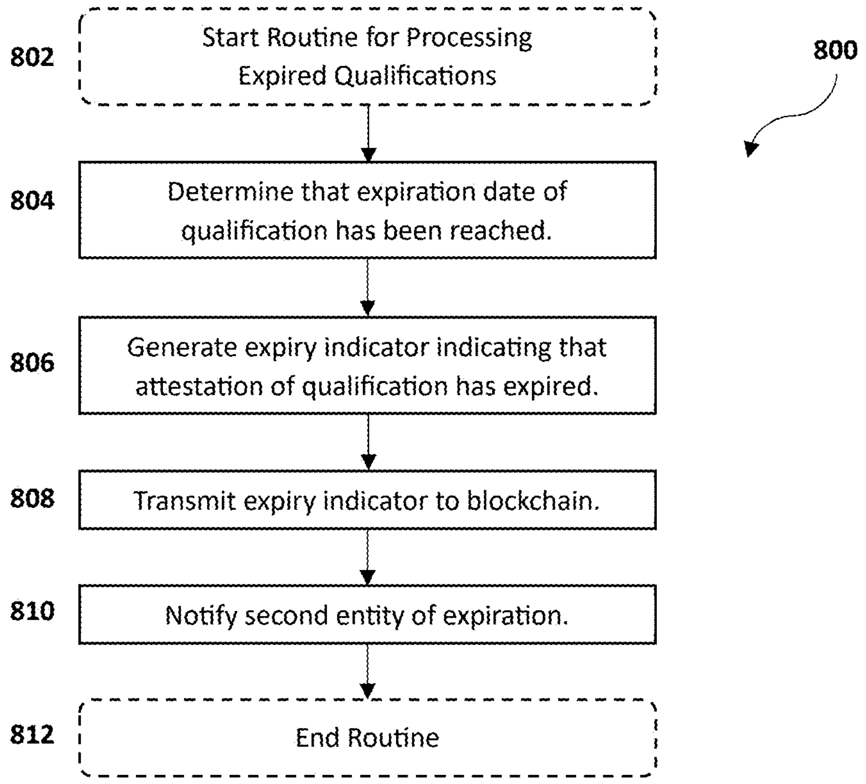
FIG. 8 is a flow diagram of a computerized method for processing expired qualifications.

FIG. 8 illustrates example routine 800 (beginning at block 802) for performing revocations, that is performed, for example, by the qualification management system 110. At block 804, the qualification management system 110 may determine that an expiration date corresponding to a qualification has been reached. One or more qualifications issued or managed by the qualification issuing system 108 and/or the qualification management system 110 may include an expiration date. In other words, the qualification is no longer valid. In some cases, the expiration of a qualification may have real-world consequences. For example, an expired driver's license may no longer allow the holder (e.g., of the expired driver's license) to legally drive a vehicle of any class. In some embodiments, the qualification management system 110 may generate an expiration trigger for each qualification issued that is associated with an expiration date. As such, when the expiration date is reached, the expiration trigger activates. Such activation causes the expiration module 110*b* of the qualification management system 110 to determine that the expiration date has been reached.

At block 806, the revocation module 110*a* generates an expiry indicator corresponding to the qualification. In some embodiments, expiry indicator includes the same information as the attestation, as described supra with the exception that that the expiry indicator includes information that indicates expiration of the attestation and/or timestamp of when the expiry indicator was generated. The expiry indicator may include the same information as the attestation for purposes of cross-referencing the attestation to ensure that the expiry indicator is correctly associated with the right attestation. In further embodiments, the expiry indicator is digitally signed by the first entity (e.g., using the private key of the first entity). The qualification management system 110 may provide functionality to allow the user of the client computing device 102 to access the private key associated with the first entity to digitally sign the expiry indicator. In some embodiments, the expiration module 110*b* of the qualification management system 110 may digitally sign the expiry indicator on behalf of the first entity (e.g., the first entity may permit such action) thereby automating the process of generating (and transmission) of the expiry indicator. In some embodiments, the private key may be linked to an ENS (Ethereum Name Service) domain of the first entity.

In some embodiments, the expiration module 110*b* may generate an expiration image having a label over the original qualification image indicating that the qualification has expired (e.g., a large banner with the words "expiration" in a red color over the original qualification image). Likewise, the same label may also be placed on an original transcript as well. Such expiration image may be included in the expiry indicator generated by the expiration module 110*b* by, for example, a link in the metadata of the expiry indicator. It should be noted that the links may be the same ones as in the attestation (e.g., the links stay the same, but the corresponding file is modified). In further embodiments, the link to the expiration image and/or the expired transcript may be in the message portion of the expiry indicator (e.g., similar to the attestation).

At block 808, the expiration module 110*b* transmits the expiry indicator to be stored or recorded on the blockchain network 118. In some embodiments, the expiry indicator may be transmitted (e.g., by the expiration module 110*b*) to be stored in the qualification database 120. At block 810, the qualification management system 110 notifies the second entity of the expiration of the qualification. For example, an email may automatically be transmitted to the email address of the second entity indicating that the qualification has expired. In some embodiments, the email may also include a link to the expiry indicator. In other embodiments, the server computer device 108 may display (e.g., via the user interface module 112) the attestation and/or expiry indicator in a user-friendly format to a user associated with the first entity and/or a user associated with the second entity (e.g., display upon request to access attestations by any of the users). For example, the user interface module 112 may display a label over the corresponding attestation (e.g., similar to FIG. 7) indicating such expiration (e.g., a large banner stating "This attestation expired on 07/10/2022 1:37:12"). Further, similar to FIG. 7, the user interface module 112 may also include a reference (e.g., identifier) to the expiration (e.g., in the blockchain network 118) in the interface displaying the attestation.

Example Routine for Renewing Qualifications

When a routine described herein (i.e., 300, 500, 600, 800, 900, 1000, 1100) is initiated, as set of executable program instructions stored on one or more non-transitory computer-readable media (e.g., hard drive, flash memory, removable media, etc.) may be loaded into memory (e.g., random access memory or RAM) of a computing device, such as the computing device 1400 shown in FIG. 14, and executed by one or more processors. In some embodiments, the routine 300, 500, 600, 800, 900, 1000, 1100, or portions thereof may be implemented on multiple processors, serially or in parallel.

Figure 9:
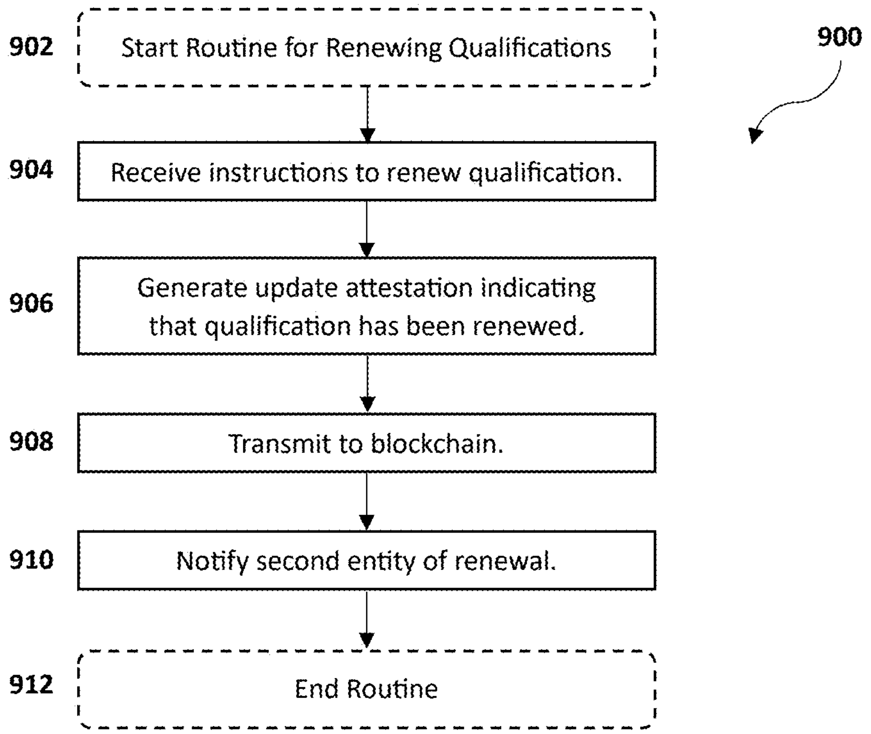
FIG. 9 is a flow diagram of a computerized method for renewing (expired) qualifications.

FIG. 9 illustrates example routine 900 (beginning at block 902) for performing revocations, that is performed, for example, by the qualification management system 110. At block 904, the qualification issuing system 108 may receive instructions to renew a qualification that has expired (e.g., reached an expiration date). For example, it is possible that the expired qualification can be renewed after one or more renewal conditions are fulfilled. In some embodiments, the one or more renewal conditions are different from the one or more conditions associated with obtaining the qualification. For example, the one or more conditions for obtaining a specific professional certificate may involve passing an exam. However, the professional certificate may have an expiration date two years after issuance of the professional certificate. The one or more renewal conditions may just require payment of a fee (as opposed to taking the exam over again).

At block 906, the attestation module generates a renewed (or updated) attestation corresponding to the qualification. In some embodiments, updated attestation includes the same information as the attestation, as described supra with the exception that that the updated attestation includes information that indicates a new expiration date of the attestation and/or timestamp of when the updated attestation was generated. The updated attestation may include the same information as the attestation for purposes of cross-referencing the attestation to ensure that the updated attestation is correctly associated with the right attestation. In further embodiments, the update attestation is digitally signed by the first entity (e.g., using the private key of the first entity). The qualification management system 110 may provide functionality to allow the user of the client computing device 102 to access the private key associated with the first entity to digitally sign the update attestation. In some embodiments, the attestation module 108*c* may digitally sign the updated attestation on behalf of the first entity (e.g., the first entity may permit such action) thereby automating the process of generating (and transmission) of the updated attestation. In some embodiments, the private key may be linked to an ENS (Ethereum Name Service) domain of the first entity.

In some embodiments, the attestation module 108*c* may generate an updated qualification image having a new expiration date. Such updated qualification image may be included in the updated attestation generated by the attestation module 108*c* by, for example, a link in the metadata of the updated attestation. It should be noted that the links may be the same ones as in the attestation (e.g., the links stay the same, but the corresponding file is modified). In further embodiments, the link to the updated qualification image and/or the original transcript may be in the message portion of the updated attestation (e.g., similar to the original attestation).

At block 908, the attestation module 108*c* transmits the updated attestation to be stored or recorded on the blockchain network 118. In some embodiments, the updated attestation is transmitted (e.g., by the attestation module 108*c*) to be stored in the qualification database 120. At block 910, the qualification issuing system 108 notifies the second entity of the renewal of the qualification. For example, an email may automatically be transmitted to the email address of the second entity indicating that the qualification has been renewed. In some embodiments, the email may also include a link to the renewed (updated) attestation. In other embodiments, the server computer device 108 may display (e.g., via the user interface module 112) the updated attestation in a user-friendly format to a user associated with the first entity and/or a user associated with the second entity (e.g., display upon request to access attestations by any of the users). Further, similar to FIG. 7, the user interface module 112 may also include a reference (e.g., identifier) to the original attestation (e.g., in the blockchain network 118) in the interface displaying the updated attestation.

Example Routine for Issuing Qualifications

When a routine described herein (i.e., 300, 500, 600, 800, 900, 1000, 1100) is initiated, as set of executable program instructions stored on one or more non-transitory computer-readable media (e.g., hard drive, flash memory, removable media, etc.) may be loaded into memory (e.g., random access memory or RAM) of a computing device, such as the computing device 1400 shown in FIG. 14, and executed by one or more processors. In some embodiments, the routine 300, 500, 600, 800, 900, 1000, 1100, or portions thereof may be implemented on multiple processors, serially or in parallel.

Figure 10:
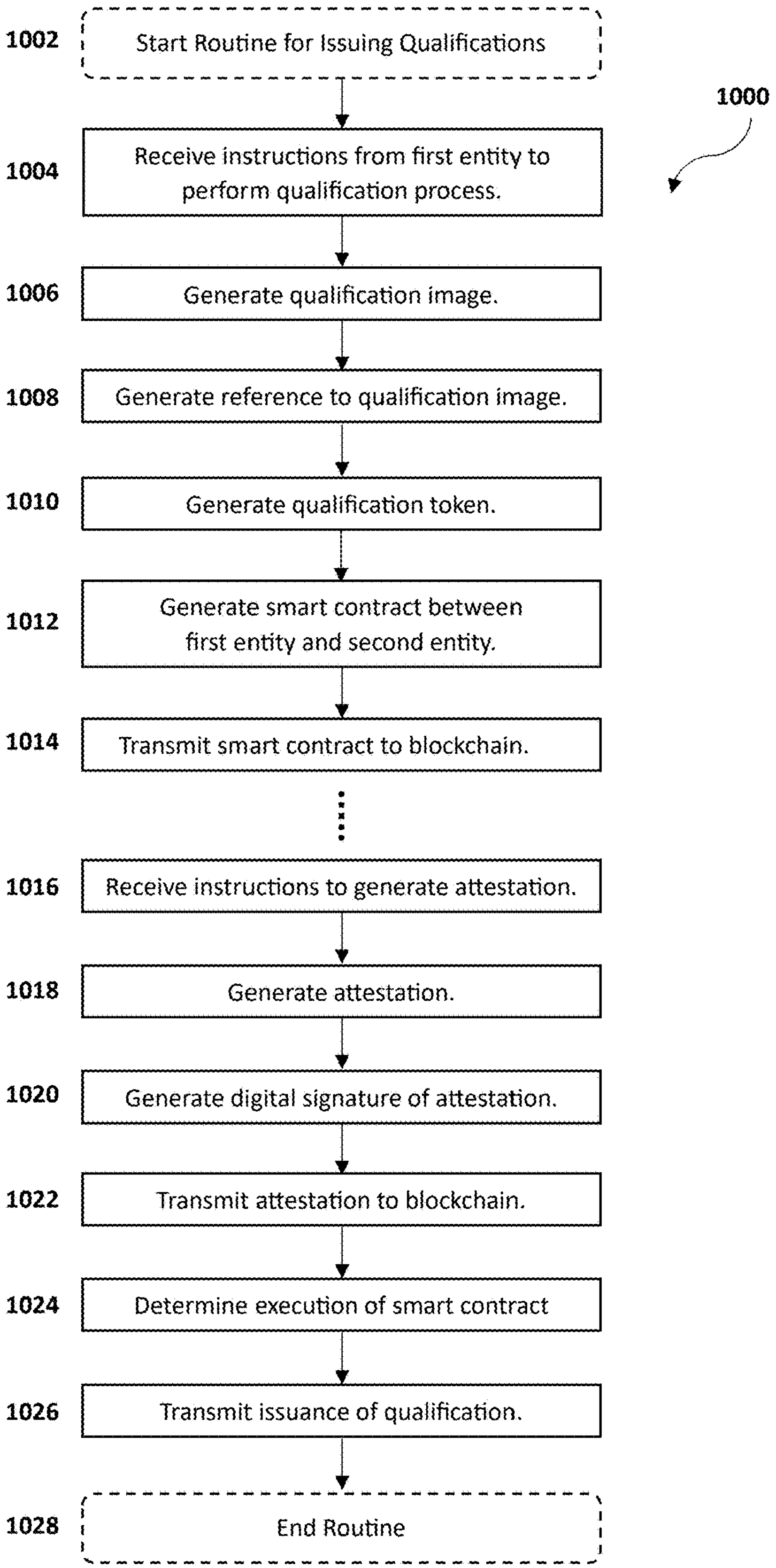
FIG. 10 is a flow diagram of a computerized method for issuing qualifications.

FIG. 10 illustrates example routine 1000 (beginning at block 1002) for issuing qualifications, that is performed, for example, by the qualification issuing system 108. At block 1004, the qualification issuing system 108 receives instructions (e.g., from a user, associated with first entity, that is operating the client computing device 102) to perform a qualification process, in which a second entity receives a qualification provided by the first entity. In some embodiments, the instructions provided at block 1002 may include the type of qualification to be issued, the name of the second entity (or second entities) to receive the qualification, and/or a digital wallet address associated with the second entity. The qualification may be an indicator that a second entity (e.g., individual) has fulfilled one or more criteria (or conditions) set forth by the providers of the qualification and, therefore, is qualified to perform a set of jobs or tasks associated with the qualification.

In some embodiments, a user associated with the first entity may be operating the client computing device 102 (as shown in FIG. 1) in which the first entity (via the user) may utilize the services of the server computing device 106 to issue qualifications. More specifically, the first entity may receive a request from a second entity (e.g., via a website provided by the second entity) for a qualification (or one or more qualifications) provided by the first entity. For example, the first entity may operate an online website that offers multiple courses, such that completion of one of the courses provides a professional certificate. The second entity may be operating the client computing device 116 to access such services (e.g., website) provided by the first entity. In some embodiments, the user interface module 112 of the server computing device 106 generates a user interface on the client computing device 102 (e.g., via an app or software installed on the client computing device 102) to allow interaction between the user (via the client computing device 102) and the server computing device 106. As such, since the first entity is using the services of the server computing device 106 to issue such qualifications, the first entity may transmit instructions to the service computing device 106 to initiate the process for issuing a qualification.

At block 1006, the image generating module 108*d* of the qualification issuing system 108 generates a qualification image. The format of the qualification image may include, but is not limited to PNG, TIFF, JPEG, BMP, PDF, and/or GIF. The qualification image corresponds to the qualification, and may include a name of the first entity, a name of the second entity, a name of the qualification, and an issue date of the qualification. In some embodiments, the qualification image is stored in the server computing device 106. In other embodiments, the qualification image is stored in the qualification database 120. In some embodiments, the qualification image is generated from a qualification template (or schema) that is stored in the server computing device 106 beforehand. At block 1008, a reference is generated for the qualification image. For example, the reference may include a link (e.g., URL) to the qualification image stored in the database or any other type of link that allows access to the qualification image stored in the database.

At block 1010, a qualification token is generated. The qualification token may be a non-fungible token (NFT) that represents the qualification, and may be transferred to a second entity (e.g., to a corresponding digital address) via the blockchain network 118. In some embodiments, the qualification token may include metadata such as, but not limited to, a name of the first entity, a name of the second entity, a name of the qualification, and an issue date of the qualification, expiration date of the qualification, a qualification identifier, a revocable indicator, a digital wallet address of the second entity, other personally identifiable information (PII) of the second entity (e.g., name, email address, physical address, digital wallet address, social security number, date of birth, place of birth, citizenship), an identifier (e.g., U.S. Patent Agent Registration No.) associating the second entity with the qualification, a signature (e.g., of an authorized employee or personnel of the first entity) officiating the n, or other non-functional information configured to enhance the prestige of the qualification. In addition, the qualification token may also include one or more references to qualification images (e.g., diploma, transcript).

At block 1012, the contract generating module 108*a* generates a smart contract. A smart contract may take the form of a contract (e.g., an agreement between two or more parties) that is transmitted to a blockchain to be stored. The smart contract may include the qualification token, such that execution of the smart contract causes the qualification token to be transferred to a digital address associated with the second entity (e.g., transferred via the blockchain network 118). In addition, the smart contract may be digitally signed by the first entity. The qualification issuing system 108 may provide functionality to allow the user of the client computing device 102 to access the private key associated with the first entity to digitally sign the smart contract. In some embodiments, the contract generating module 108*a* of the qualification issuing system 108 may digitally sign the smart contract on behalf of the first entity (e.g., the first entity may permit such action) thereby automating the process of generating (and transmission) of the smart contract. In some embodiments, the private key may be linked to an ENS (Ethereum Name Service) domain of the first entity.

For example, the smart contract may identify the first entity and the second entity as parties to the contract. In another example, the smart contract may be written in one or more programming languages (e.g., Solidity, Vyper, Rust, Yul, Python, Java, JavaScript, C++). The smart contract may automatically be executed after one or more terms or conditions (associated with the smart contract) are fulfilled. In such case, the smart contract may execute (e.g., execute) after the smart contract detects that an attestation associated with the qualification is stored on the blockchain network 118. In some embodiments, the smart contract is generated from a template (or schema), such that the fulfillment conditions are the same for each one. In some embodiments, the smart contract may include an execution mechanism that detects when an attestation with an execution identifier is transmitted to be stored in the blockchain network 118.

At block 1016 (e.g., after an indeterminant amount of time has passed), the qualification issuing system 108 may receive instructions to generate an attestation. In other words, it may be determined that the conditions of the qualification may have been fulfilled. For example, the conditions for the qualification may be passing an exam with a score higher than a minimum designated score or the completion of a total number of credits in connection with an academic degree. In another embodiment, the fulfillment of the conditions may be automatically transferred to the client computing device 102. For example, the second entity may have taken an exam electronically accessed using software (e.g., associated with the first entity or a third-party service) or a browser on a computer, in which the second entity is immediately informed (e.g., notified) of the results after completion of the exam (automatically by the software). Thus, in the case that the second entity passes the exam, the software (providing the exam) may notify the qualification issuing system 108 automatically. In turn, the attestation module 108*c* may generate an attestation after receiving notification of the fulfillment of the one or more conditions.

At block 1018, the attestation module 108*c* of the qualification issuing system 108 generates an attestation. In some embodiments, the attestation may include, but is not limited to, a name of the first entity, a name of the second entity, a name of the qualification, and an issue date of the qualification, expiration date of the qualification, a qualification identifier, a revocable indicator, a digital wallet address of the second entity, other personally identifiable information (PII) of the second entity (e.g., name, email address, physical address, digital wallet address, social security number, date of birth, place of birth, citizenship), an identifier (e.g., U.S. Patent Agent Registration No.) associating the second entity with the qualification, a signature (e.g., of an authorized employee or personnel of the first entity) officiating the qualification, or other non-functional information configured to enhance the prestige of the qualification.

In some embodiments, the attestation may include an execution identifier that causes the corresponding smart contract to execute. In other embodiments, the attestation may include a trigger mechanism that causes the smart contract to execute after the attestation is stored in the blockchain network 118. In other embodiments, the attestation may also comprise a message, which may include links (e.g., uniform resource locator (URL)) to one or more databases (e.g., qualification database 120 or third-party database). For example, as discussed previously, the qualification image may be stored in the qualification database 120. As such, a link may be included in the attestation to link to the corresponding qualification image. Regardless, the link may still be directed to the same file (corresponding to the transcript) stored on the database. As such, even if the contents of the file may change or be modified, the file is at the same location to which the link is pointing.

At block 1022, a digital signature of the attestation is generated. As discussed previously, the attestation may be a statement that is digitally signed by the first entity (e.g., by using a private key of the first entity) to indicate that the qualification was indeed issued by the first entity. Consequently, any third-party may verify the digitally signed attestation by using, for example, the public key associated with the first entity. The qualification issuing system 108 may provide functionality to allow the user of the client computing device 102 to access the private key associated with the first entity to digitally sign the expiry indicator. In some embodiments, the qualification issuing system 108 may digitally sign the attestation on behalf of the first entity (e.g., the first entity may permit such action) thereby automating the process of generating (and transmission) of the attestation.

At block 1022, the attestation module 108*c* may transmit the attestation to be stored or recorded on the blockchain network 118. In some embodiments, the attestation may be transmitted (e.g., by the attestation module 108*c*) to be stored in the qualification database 120. As discussed previously, the smart contract may execute after determining that there is a corresponding attestation on the blockchain network 118. For example, the smart contract may (e.g., at set intervals or at a set date) perform a check of the blockchain network 118 on whether the attestation has been transmitted via an execution mechanism. The smart contract may identify the attestation via the execution identifier included in the attestation. In some embodiments, the attestation may include a trigger mechanism that causes the smart contract to execute (e.g., causes execution as soon as the attestation is stored or recorded on the blockchain network 118). The execution of the smart contract causes the qualification token stored on the smart contract to be transferred to the digital wallet (address) of the second entity.

At block 1024, the qualification issuing system 108 determines whether the smart contract has been executed. For example, the qualification issuing system 108 may monitor the blockchain network 118 to determine whether the qualification token has been successfully transferred to the digital wallet (address) of the second entity. In some embodiments, the user interface module 108*c* may display the status of whether the second entity received the qualification token, as shown, for example, in FIG. 4 ("Received Non-Fungible Token?Yes"). At block 1026, the qualification issuing system 108 transmits the qualification image to the second entity. In some embodiments, the qualification issuing system 108 may transmit the qualification image after determining that the second entity has received the qualification token (which is recorded on the blockchain network 118). It should be noted that in other embodiments, the qualification issuing system 108 may transmit the qualification image (e.g., and also a communication indicating that the second entity has been issued the qualification) to the second entity after transmitting the attestation, thereby making it possible to exclude block 1024 in the routine 300. In further embodiments, the qualification issuing system 108 may automatically transmit the qualification image to the second entity using an email address of the second entity. This may be performed by attaching the qualification image as a file or as a link (e.g., URL linked to the database) in the email. In another embodiment, the qualification issuing system 108 may cause the qualification image to be physically printed to a printing device (to be mailed to the second entity). At block 1028, the routine ends.

Example Routine for Generating Qualifications Timeline

When a routine described herein (i.e., 300, 500, 600, 800, 900, 1000, 1100) is initiated, as set of executable program instructions stored on one or more non-transitory computer-readable media (e.g., hard drive, flash memory, removable media, etc.) may be loaded into memory (e.g., random access memory or RAM) of a computing device, such as the computing device 1400 shown in FIG. 14, and executed by one or more processors. In some embodiments, the routine 300, 500, 600, 800, 900, 1000, 1100, or portions thereof may be implemented on multiple processors, serially or in parallel.

Figure 11:
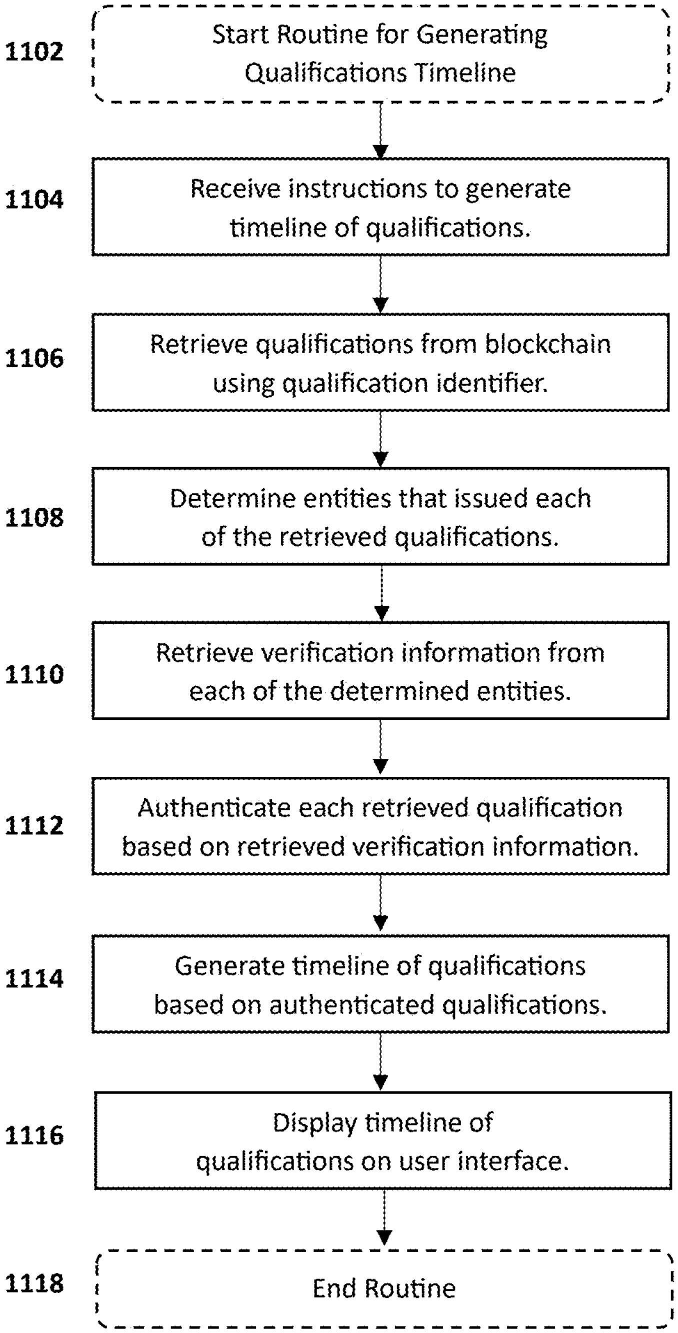
FIG. 11 is a flow diagram of a computerized method for generating a qualifications timeline.

FIG. 11 illustrates example routine 1100 (beginning at block 1102) for generating a qualifications timeline, that is performed, for example, by the timeline generating module 114. At block 1104, the timeline generating module 114 receives instructions to generate a timeline of qualifications associated with a second entity. For example, the second entity may be a candidate for an employment position at an organization or an applicant to a school (e.g., University). In other embodiments, the second entity may have provided a list of qualifications associated with the second entity (e.g., resume, curriculum vitae) to a third entity (e.g., the organization or the school). In addition, the second entity may also provide electronic copies of diplomas (including transcript), professional certificates, occupational licenses, legal authorizations to the third entity. In further embodiments, the second entity may provide a digital wallet address (or two or more digital wallet addresses) associated with the second entity (that is associated with the qualifications on the list). In yet further embodiments, the second entity may also provide the qualification identifier associated with the qualifications in the list of qualifications provided by the second entity.

As such, the third entity may wish to verify the qualifications history of the second entity to ensure that the second entity is not trying to commit fraud upon the third entity. To facilitate such verification, a user (e.g., employee or owner of the third entity) may access the services provided by the timeline generating module 114 to authenticate the qualifications provided by the second entity. For example, the third entity request generation of a timeline of qualifications by inputting qualification identifier provided by the second entity. In another example, the third entity may also input one or more of the personally identifiable information (PII) of the second entity (e.g., name, date of birth) or a digital wallet address provided by the second entity.

At block 1106, the timeline generating module 114, retrieves the qualifications from the blockchain network 118 using the qualification identifier. For example, the timeline generating module 114 may retrieve attestations or qualification tokens from the blockchain network 118 that are associated with the qualification identifier. In some embodiments, the timeline generating module 114 may use the PII or a digital wallet address provided by the second entity to search the blockchain network 118 for the qualifications. At block 1108, the timeline generating module 114 may determine entities (e.g., private organizations, universities, government) that issued each of the retrieved qualifications. In other words, the qualifications retrieved by the server computing device 108 may not necessarily be provided or issued by the same entity. As such, the timeline generating module 114 may retrieve verification information from each of the determined entities.

The verification information may include a digital certificate, such as a public key certificate associated with an entity that issued the qualification. The public key certificate may include a public key that includes a corresponding private key used to digitally sign the attestation, smart contract, or qualification token associated with the qualification. The public key certificate may be made publicly available, such that anyone may have access to such public key certificate. In some embodiments, the server computing device 106 may have already stored one or more of the public key certificates of the entities. Therefore, the timeline generating module 114 may merely retrieve the public key certificate from a storage section of the server computing device.

At block 1112, the timeline generating module 114 may authenticate each retrieved qualification based on retrieved verification information. For example, the timeline generating module 114 may use the public key of the public key certificate to authenticate the corresponding attestation or qualification token associated with the qualification. In some embodiments, the timeline generating module 114 also authenticates any revocations or expiry indicators (associated with the qualification) using the verification information. At block 1114, the timeline generating module 114 generates a timeline of qualifications based on the authenticated qualification. In some embodiments, any qualifications that could not be authenticated may not necessarily appear on the timeline.

Figure 12:
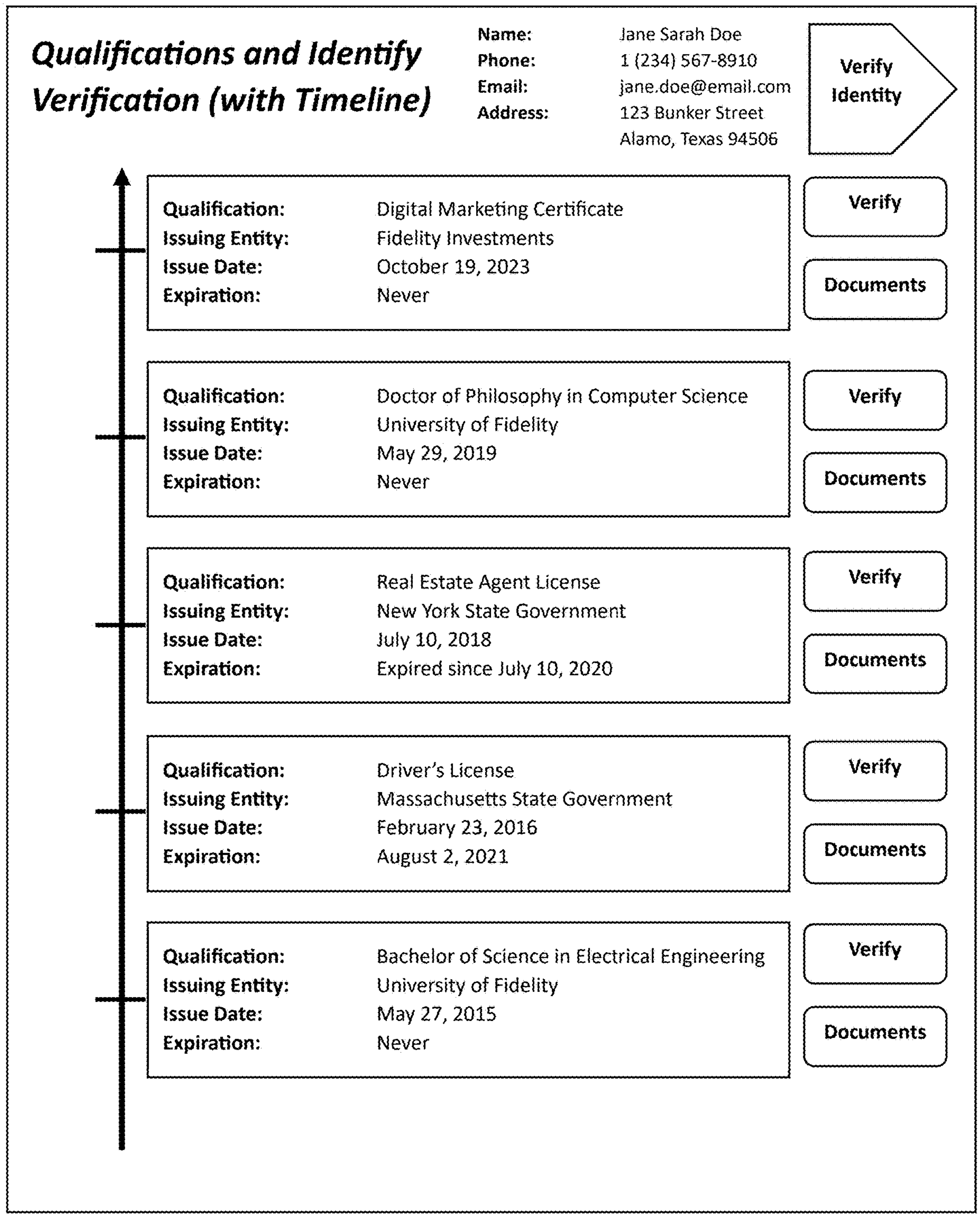
FIG. 12 is an example diagram illustrating a qualifications timeline.

At block 1116, the timeline generating module 114 transmits the timeline to the user interface module 112, which in turn generates a timeline interface for display on a client computing device associated with the third entity. An example of such a timeline interface is shown in FIG. 12. As shown, the qualifications including relevant information (e.g., "Issuing Entity", "Issue Date", "Expiration") are included in the timeline as well. In some embodiments, the expiry indicator and revocations are indicated on the timeline. In other embodiments, the personally identifiable information (PII) may also be present in the qualification time lines (e.g., "Name: Jane Sarah Doe"). For example, such PII may be extracted from the metadata corresponding to the attestations, revocations, expiry indicators or qualification tokens.

In further embodiments, the user may also be presented with the option to check on the documents (e.g., qualification image) associated with the qualification by activating a button ("Documents"). For example, activating such "documents" button associated with the qualification "Bachelor Science in Electrical Engineering") may provide the user (associated with the third entity) with qualification images corresponding to a diploma and transcripts. In some embodiments, one or more portions of the qualification image may be inaccessible to the third party without authorized permission from the second entity. For example, the user associated with the third entity may be able to view certain portions of the transcript (e.g., student name, student identification no., university, degree name, courses taken). However, other portions of the transcript may not be viewed (e.g., blurred or blocked) without permission (e.g., performance measurements or grades associated with courses, final grade point average). As such, the second entity may provide a password or passcode for the user to use in accessing the portions of the transcript that are currently unviewable.

Figure 13:
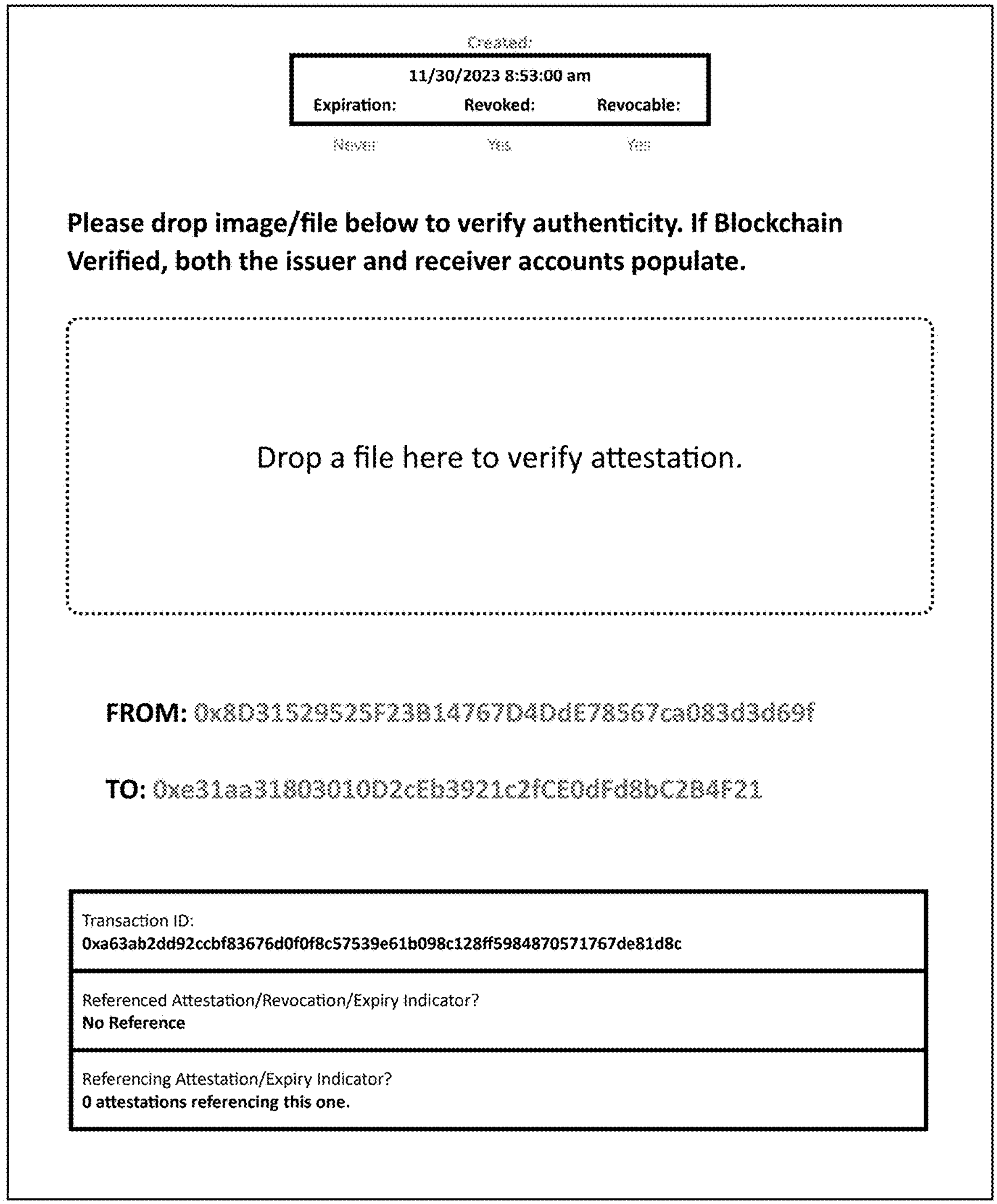
FIG. 13 is an example diagram illustrating an interface for verifying files associated with qualifications.

In other embodiments, the identity of the second entity may be authenticated using a specific qualification. For example, in the example shown in FIG. 12, the timeline shows a driver's license as one of the qualifications that are associated with the second entity. In most cases, the driver's licenses are used to verify the identities of individuals. As such, the timeline generating module 114 may have authenticated the driver's license using the public key of the public certificate associated with the government agency that issued the driver's license. Therefore, the user (associated with the third entity) may activate the "Verify Identity" button to verify whether the PII is valid in view of the driver's license. In other words, the timeline generating module 114 may be capable of authenticating the identity or PII of the second entity after authenticating a specific type of qualification (e.g., an identity qualification, driver's license). In further embodiments, the user (associated with the third entity) may also be provided with the option to verify documents provided by the second entity (e.g., diplomas (including transcript), professional certificates, occupational licenses, legal authorizations) by activating the "Verify" button, as shown in FIG. 12, which leads to the user interface shown in FIG. 13. As can be shown, the user can drag and drop a file (e.g., qualification image associated with the qualification) into the interface to verify the hash associated with the file. The user interface shown in FIG. 13 may also display a digital address of the issuer ("0x8D3 . . . 3d69f") and/or a digital address of the receiver of the qualification ("0xe31 . . . B4F21"). The routine ends at block 1118.

Execution Environment

FIG. 14 illustrates various components of an example computing device 1400 configured to implement various functionality described herein.

In some embodiments, the computing device 1400 may be implemented using any of a variety of computing devices, such as server computing devices, desktop computing devices, personal computing devices, mobile computing devices, mainframe computing devices, midrange computing devices, host computing devise, or some combination thereof.

In some embodiments, the features and services provide by the computing device 1400 may be implemented as webs services consumable via one or more communication networks. In further embodiments, the computing device 1400 is provided by one or more virtual machines implemented in a hosted computing environment. The hosted computing environment may include one or more rapidly provisioned and released computing resources such as computing devices, networking devices, and/or storage devices. A hosted computing environment may also be referred to as a "cloud" computing environment.

In some embodiments, as shown, a computing device 1400 may include one or more processors 1402, such as physical central processing units ("CPUs"); one or more network interfaces 1404, such as network interface cards ("NICs"); one or more computer readable medium drives 1406, such as a high density disk ("HDDs"), solid state drives ("SSDs"), flash drives, and/or other persistent computer readable media; one or more input/output drive interfaces 1408; and one or more computer-readable memories 1410, such as random access memory ("RAM") and/or other volatile non-transitory readable media.

The one or more computer-readable memories 1410 may include computer program instructions that one or more computer processors 1402 execute and/or data that the one or more computer processors 1402 use in order to implement one or more embodiment. For example, the one or more computer-readable memories 1410 can store an operating system 1412 to provide general administration of the computing device 1400. As another example, the one or more computer-readable memories 1410 can store certificate generating system 1414 (e.g., qualification issuing system 108) for issuing qualifications. In a further example, the one or more computer-readable memories 1410 can store a qualification management system (e.g., qualification management system 110) for managing issued qualifications. In yet another example, the one or more computer-readable memories 1410 can store a user interface module 1418 (e.g., user interface module 112), which displays various user interfaces, such as attestations, qualification tokens. In yet a further example, the one or more computer-readable memories 1410 can store a timeline generating module 1420 (e.g., timeline generating module 114), which generates a timeline of the qualifications (e.g., for display by the user interface module 1418).

Terminology

A token may be a digital asset based upon a computer generated mathematical and/or cryptographic protocol that may, among other things, be exchanged for value and/or be used in exchanges involving goods or services. For example, tokens can represent anything from digital objects to objects in the physical world. In some embodiments, a token may be based on an open source mathematical and/or cryptographic protocol, which may exist on a blockchain network. Such blockchain network may be centralized (e.g., run by one or more central servers) or decentralized (e.g., run through a peer-to-peer network). Tokens may be maintained, tracked, and/or administered by the blockchain network.

A blockchain network may involve a decentralized electronic ledger system, which may be maintained by a plurality of physically remote computer systems. Such a ledger may be a public ledger, which may track asset ownership and/or transfers of assets (e.g., tokens) from one address to another address. The ledger may be a decentralized public ledger, which can be distributed to users in the network (e.g., via peer-to-peer sharing). Updates to the ledger may be broadcast to the users across the network. Each user may maintain an electronic copy of all or part of the ledger, as described herein. The ledger allows for authentication of each block in the blockchain. Each user transfers a digital asset (e.g., token) to the next user by digitally signing them over to the next user in a blockchain transfer which is published to and added on to a block on the blockchain. A transferee can then verify each previous transaction (e.g., by analyzing the blockchain to verify the chain of ownership).

The blockchain network may timestamp transfers by including them in the blocks that constitute the blockchain. In some embodiments, the addition of a block may occur periodically (e.g., approximately every 15 seconds, every minute, every 2.5 minutes or every 10 minutes). Such blocks may not be changed without redoing the work that was required to create each block since the modified block. The longest blockchain may serve not only as proof of the sequence of events but also records that this sequence of events was verified by a majority of the computing power of the blockchain network. The blockchain recognized by the nodes corresponding to the majority of computing power, or some other consensus mechanism, may become the accepted blockchain for the network. In some embodiments, confirmation of a transfer may be attained with a high degree of accuracy following the addition of a fixed number of blocks to the blockchain (e.g., six blocks) after a transfer was performed and first recorded on the blockchain.

There are a variety of consensus mechanisms (or protocols) that may be used to verify transactions recorded in a blockchain. Usually, such mechanisms involve one or more computer systems (e.g., miners) or pools of computer systems (e.g., mining pools) that can solve algorithmic equations allowing them to add records of recent transfers (e.g., blocks) to a chain of transfers. For example, blockchains may rely on proof of work, which is a concept used to demonstrate that a program did the work required to propose a new block for the chain, in which network consensus is reached after there is proof that the work was done without any attempts to alter data within the block. Proof of work is provided by sending the information in a block through a hashing algorithm, then adjusting variable fields until a number is reached that has a lower value than the difficulty target of the blockchain network. This serves as proof that the program expended the computational effort to "hash" the block until a solution was reached. In another example, the proof of stake protocol is another mechanism that may be implemented by blockchains. In this type of protocol, a validator's stake is represented by the amount of digital assets (e.g., tokens) held. Validators accept, reject or otherwise validate a block to be added to the blockchain based on the amount of digital assets held by the validator on the blockchain. If the validators are successful in validating and adding the block, such a protocol, in embodiments, will award successful validators are a fee in proportion to their stake.

In some embodiments, digital assets based on a blockchain, may, in turn, include "smart contracts", which is a self-executing program that is stored (e.g., hosted) and executed on a blockchain network. Smart contracts execute automatically when one or more predetermined conditions are fulfilled without the need for intermediaries (e.g., banks, lawyers, or voting authorities). Smart contracts can also automate complex workflows by triggering the next action when certain conditions are fulfilled. Further, smart contracts can operate independently, but many decentralized applications can implement several contracts that work together to achieve certain functionalities. In some embodiments, at least one of the parties to the smart contract triggers execution of the smart contract (e.g., when such party believes that the predetermined conditions are fulfilled). In other embodiments, an oracle may be used to trigger execution of the smart contract. Due to the fact that it is possible to have one or more conditions occur outside (e.g., off-chain) the scope of the blockchain (e.g., weather, sports results, etc.), smart contracts may need to determine the fulfillment of the one or more conditions via an outside service. The oracle is a third-party service with which a smart contract is programmed to communicate in order to determine whether a condition is fulfilled. Such communication can be in either direction (e.g., oracle transmits message to smart contract or smart contract transmits a request to the oracle).

It should be noted that there may be more than one type of oracle. For example, input oracles obtain data from the real-world (offchain) and transmit such data to a blockchain network for smart contract execution. In another example, output oracles allow smart contracts to transmit commands to offchain systems that to cause such systems to perform certain actions (e.g., informing a banking network to make a payment, telling a storage provider to store the supplied data, or pinging a system to unlock a car door once the on chain rental payment is made). In a further example, cross-chain oracles can read and write information between different blockchains. Cross-chain oracles enable interoperability for moving both data and assets between blockchains, such as using data on one blockchain to trigger an action on another or bridging assets cross-chain so they can be used outside the native blockchain on which they were issued. Compute-enabled oracles use secure offchain computation to provide decentralized services that are impractical to do on chain due to technical, legal, or financial constraints. For example, such oracle may be used to trigger the running of smart contracts when predefined events take place, computing zero-knowledge proofs to generate data privacy, or running a verifiable randomness function to provide a tamper-proof and provably fair source of randomness to smart contracts.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus (e.g., a programmable processor, a computer, and/or multiple computers). A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the invention by operating on input data and/or generating output data. Method steps can also be performed by, and an apparatus can be implemented as, special purpose logic circuitry (e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like). Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random-access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data (e.g., magnetic, magneto-optical disks, or optical disks). A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices (e.g., DRAM, SRAM, EPROM, EEPROM, and flash memory devices); magnetic disks (e.g., internal hard disks or removable disks); magneto-optical disks; and optical disks (e.g., CD, DVD, HD-DVD, and Blu-ray disks). The processor and the memory can be supplemented by and/or incorporated in special purpose logic circuitry.

To provide for interaction with a user, the above-described techniques can be implemented on a computing device in communication with a display device (e.g., a CRT (cathode ray tube), plasma, or LCD (liquid crystal display) monitor, a mobile device display or screen, a holographic device and/or projector, for displaying information to the user and a keyboard and a pointing device (e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback (e.g., visual feedback, auditory feedback, or tactile feedback; and input from the user can be received in any form, including acoustic, speech, and/or tactile input).

The above-described techniques can be implemented in a distributed computing system that includes a back-end component. The back-end component can, for example, be a data server, a middleware component, and/or an application server. The above-described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above-described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

The above-described techniques can be implemented using supervised learning and/or machine learning algorithms. Supervised learning is the machine learning task of learning a function that maps an input to an output based on example input-output pairs. It infers a function from labeled training data consisting of a set of training examples. Each example is a pair consisting of an input object and a desired output value. A supervised learning algorithm or machine learning algorithm analyzes the training data and produces an inferred function, which can be used for mapping new examples.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. A computer system for validating the qualifications of an entity to prevent fraud, the system comprising a server computing device having a memory for storing computer-executable instructions and a processor that executes the computer-executable instructions to:

receive instructions from a first entity to generate a smart contract between the first entity and a second entity, the second entity being provided with a qualification token upon fulfillment of one or more conditions associated with the smart contract, wherein the qualification token is a non-fungible token that represents an issuer-verified qualification provided by the first entity and the qualification token is distinct from a digital media asset;

generate a qualification image that represents the qualification in a graphical format, wherein the qualification image is generated to be uniquely associated with the first entity;

transmit the smart contract for recordation in a blockchain;

transmit an execution instruction to the blockchain to trigger the smart contract after receiving a fulfillment notification indicating that the second entity has fulfilled the one or more conditions, wherein execution of the smart contract provides the second entity with a qualification token, and wherein issuance of the qualification token is conditioned on issuer verification rather than token minting alone, wherein the qualification token comprises tamper-evident metadata including (i) qualification information, (ii) a reference to the qualification image, and (iii) a qualification identifier that is cryptographically bound to the first entity as an issuer; and generate an entity profile of the second entity by accessing the blockchain to retrieve the qualification token associated with the first entity, the retrieval being performed using the qualification identifier to verify provenance and qualification validity, wherein the entity profile displays the qualification information and the qualification image.

2. The system of claim 1, wherein the computer-executable instructions further cause the processor to perform operations to:

generate an attestation in connection with the qualification, the attestation constituting an issuer-asserted validity state of the qualification token and indicating that the qualification has been validly provided to the second entity by the first entity, wherein the attestation is digitally signed by the first entity;

transfer the attestation to the second entity via the blockchain, the attestation being stored on the blockchain, wherein the attestation is retrieved from the blockchain to be displayed on the entity profile when the entity profile is generated, and wherein the attestation is configured to be verifiable by a third entity by matching the digital signature to the first entity.

3. The system of claim 1, wherein the computer-executable instructions further cause the processor to perform operations to:

generate a revocation of the attestation associated with the qualification token after receiving revocation instructions from the first entity, the revocation representing a transition of the qualification token from a valid state to an invalid state under issuer control and indicating that the qualification provided to the second entity has been revoked by the first entity, wherein the revocation is digitally signed by the first entity; and transfer the revocation to the second entity via the blockchain, the revocation being stored on the blockchain, wherein the revocation is retrieved from the blockchain to be displayed, along with a revocation timestamp, on the entity profile when the entity profile is accessed.

4. The system of claim 3, wherein the revocation instructions are generated by the first entity after determining that at least one of the one or more conditions has been fraudulently fulfilled by the second entity, wherein the determination is made by the first entity as issuer of the qualification token, and wherein the revocation indicates which one of the one or more conditions has been fraudulently fulfilled on the entity profile.

5. The system of claim 4, wherein the qualification includes an expiration date, and wherein the computer-executable instructions further cause the processor to perform operations to:

generate an expiry indicator with respect to the attestation associated with the qualification token after receiving the expiration notification indicating that the expiration date has been reached, wherein the expiry indicator is cryptographically linked to the qualification identifier such that verification queries reflect an expired state; and transfer the expiry indicator to the second entity via the blockchain, the expiry indicator being stored on the blockchain, wherein the expiry indicator is retrieved from the blockchain to be displayed, along with an expiration timestamp, on the entity profile when the entity profile is accessed.

6. The system of claim 5, wherein the first entity provides one or more renewal conditions for renewing the expired certificate, wherein the computer-executable instructions further cause the processor to perform operations to:

receive a renewal notification from the second entity indicating that the qualification is to be renewed due to fulfillment of the one or more renewal conditions;

generate an updated attestation indicating that the qualification has been validly renewed by the first entity, the updated attestation re-establishing a valid state of the qualification token without minting a new token, wherein the updated attestation is digitally signed by the first entity; and transfer the updated attestation to the second entity via the blockchain, the updated attestation being stored on the blockchain, wherein the updated attestation is retrieved from the blockchain to be displayed, along with a renewal timestamp, on the entity profile when the entity profile is accessed.

7. A non-transitory computer-readable medium including computer-executable instructions that, when executed by a computing device, cause the computing device to:

receive instructions from a first entity to generate a smart contract between the first entity and a second entity, the second entity being provided with a qualification token upon fulfillment of one or more conditions associated with the smart contract, wherein the qualification token is a non-fungible token that represents an issuer-verified qualification provided by the first entity and the qualification token is distinct from a digital media asset;

generate a qualification image that represents the qualification in a graphical format, wherein the qualification image is generated to be uniquely associated with the first entity;

transmit the smart contract for recordation in a blockchain;

transmit an execution instruction to the blockchain to trigger the smart contract after receiving a fulfillment notification indicating that the second entity has fulfilled the one or more conditions, wherein execution of the smart contract provides the second entity with a qualification token, and wherein issuance of the qualification token is conditioned on issuer verification rather than token minting alone, wherein the qualification token comprises tamper-evident metadata including (i) qualification information, (ii) a reference to the qualification image, and (iii) a qualification identifier that is cryptographically bound to the first entity as an issuer; and generate an entity profile of the second entity by accessing the blockchain to retrieve the qualification token associated with the first entity, the retrieval being performed using the qualification identifier to verify provenance and qualification validity, wherein the entity profile displays the qualification information and the qualification image.

8. The non-transitory computer-readable medium of claim 7 wherein the qualification image includes issuer-controlled indicia verifying authenticity of the qualification and at least one of a name of the first entity, a name of the second entity, a name of the qualification associated with the qualification token, and an issue date of the qualification.

9. The non-transitory computer-readable medium of claim 7, wherein the second entity is associated with two or more qualifications, and wherein the computer executable instructions cause the computing device to perform operations to:

generate a timeline in the entity profile corresponding to the second entity, wherein the timeline displays the two or more qualifications chronologically in a list, in which each qualification displayed includes the qualification information obtained from the metadata of the qualification token, and wherein chronological ordering reflects issuance, revocation, expiration, and renewal events derived from the qualification token metadata.

10. The non-transitory computer-readable medium of claim 9, wherein the timeline includes one or more icons representing the two or more qualifications associated with the second entity, wherein activation of an icon of the one or more icons causes the display of a qualification image and an associated validity state derived from the attestation or revocation associated with the qualification corresponding to the icon.

11. The non-transitory computer-readable medium of claim 7, wherein the one or more conditions associated with the smart contract includes a requirement to complete one or more courses, and the metadata of the qualification token includes a reference to a course record used by the first entity to determine satisfaction of issuance or renewal conditions and indicating a performance measurement for each completed course of the one or more courses.

12. The non-transitory computer-readable medium of claim 7, wherein the entity profile includes the course record for display, and wherein the course record is blocked from viewing without permission from the second entity without affecting validity of the qualification token itself.

13. The non-transitory computer-readable medium of claim 12, wherein the permission from the second entity is in the form of a passcode, in which entry of the passcode is required before viewing the course record displayed on the entity profile while third-party verification of qualification validity remains available via the blockchain.

14. A computerized method for validating the qualifications of an entity to prevent fraud, the method comprising:

receiving instructions from a first entity to generate a smart contract between the first entity and a second entity, the second entity being provided with a qualification token upon fulfillment of one or more conditions associated with the smart contract, wherein the qualification token is a non-fungible token that represents an issuer-verified qualification provided by the first entity and the qualification token is distinct from a digital media asset;

generating a qualification image that represents the qualification in a graphical format, wherein the qualification image is generated to be uniquely associated with the first entity;

transmitting the smart contract for recordation in a blockchain;

transmitting an execution instruction to the blockchain to trigger the smart contract after receiving a fulfillment notification indicating that the second entity has fulfilled the one or more conditions, wherein execution of the smart contract provides the second entity with a qualification token, and wherein issuance of the qualification token is conditioned on issuer verification rather than token minting alone, wherein the qualification token comprises tamper-evident metadata including (i) qualification information, (ii) a reference to the qualification image, and (iii) a qualification identifier that is cryptographically bound to the first entity as an issuer; and generating an entity profile of the second entity by accessing the blockchain to retrieve the qualification token associated with the first entity, the retrieval being performed using the qualification identifier to verify provenance and qualification validity, wherein the entity profile displays the qualification information and the qualification image.

15. The computerized method of claim 14, wherein the second entity is associated with two or more qualifications, wherein each of the two or more qualifications is represented by a corresponding qualification token having a distinct qualification identifier, and wherein qualification images corresponding to the two or more qualifications are stored in a database.

16. The computerized method of claim 14, further comprising:

responding to a verification query from a third entity by validating, using the qualification identifier, a current validity state of the qualification token based on one or more attestations, revocations, or expiration indicators recorded on the blockchain, without granting the third entity access to underlying qualification documents.

17. The computerized method of claim 14, wherein generating the revocation further comprises:

recording, in association with the qualification token, an issuer-asserted fraud determination indicator identifying that at least one issuance condition was fraudulently satisfied, such that the fraud determination indicator is auditable via the blockchain.

18. The computerized method of claim 14, further comprising:

configuring the qualification token as non-transferable between blockchain addresses, such that ownership of the qualification token remains bound to the second entity regardless of blockchain transaction attempts.

19. The computerized method of claim 14, further comprising:

causing a verification request for the qualification token to fail when the qualification token is associated with a revoked or expired state, thereby preventing affirmative verification of the qualification despite continued presence of the qualification token on the blockchain.

20. The computerized method of claim 14, further comprising:

providing, to a third entity in response to a verification request, a cryptographic proof derived from the qualification token that confirms satisfaction of one or more verification criteria without revealing the qualification information, qualification image, or underlying qualification documents, wherein the cryptographic proof is verifiable using issuer-associated verification material recorded on or referenced by the blockchain.

* * * * *